(12) United States Patent
Ito

(10) Patent No.: US 9,143,458 B2
(45) Date of Patent: Sep. 22, 2015

(54) NETWORK DEVICE, METHOD FOR CONTROLLING THE NETWORK DEVICE, AND NETWORK SYSTEM

(71) Applicant: Hitachi High-Technologies Corporation, Tokyo (JP)

(72) Inventor: Daisuke Ito, Tokyo (JP)

(73) Assignee: Hitachi High-Technologies Corporation, Tokyo (JP)

( * ) Notice: Subject to any disclaimer, the term of this patent is extended or adjusted under 35 U.S.C. 154(b) by 168 days.

(21) Appl. No.: 14/075,158

(22) Filed: Nov. 8, 2013

(65) Prior Publication Data

US 2014/0126372 A1 May 8, 2014

(30) Foreign Application Priority Data

Nov. 8, 2012 (JP) ................. 2012-246572

(51) Int. Cl.
*H04L 1/00* (2006.01)
*H04L 12/893* (2013.01)
*H04L 12/801* (2013.01)

(52) U.S. Cl.
CPC ............... *H04L 47/40* (2013.01); *H04L 47/193* (2013.01)

(58) Field of Classification Search
CPC ......... H04L 47/10; H04L 47/11; H04L 47/12; H04L 47/13; H04L 2012/5631; H04L 2012/5632; H04L 2012/5633; H04L 2012/5634; H04L 47/35; H04L 47/36; H04L 47/37
USPC .......... 370/229–235, 252, 390–392, 351–356
See application file for complete search history.

(56) References Cited

U.S. PATENT DOCUMENTS

| | | | |
|---|---|---|---|
| 2002/0071436 A1* | 6/2002 | Border et al. | ............ 370/395.32 |
| 2003/0026258 A1 | 2/2003 | Takatani et al. | |
| 2003/0177396 A1* | 9/2003 | Bartlett et al. | ................ 713/201 |
| 2005/0025150 A1 | 2/2005 | Helmy et al. | |

FOREIGN PATENT DOCUMENTS

| | | |
|---|---|---|
| JP | 2003-069615 A | 3/2003 |
| JP | 2004-260668 A | 9/2004 |

OTHER PUBLICATIONS

Information Sciences Institute University of Southern California, "Ttransmission Control Protocol, Darpa Internet Program, Protocol Specification", pp. 3-6, sec. 1.5, "Flow Control", http://datatracker.ietf. org/ doc/ ric793, Sep. 1981.

* cited by examiner

*Primary Examiner* — Dady Chery
(74) *Attorney, Agent, or Firm* — Volpe and Koenig, P.C.

(57) ABSTRACT

A device that can sufficiently speed up a communication of a TCP is provided. A network device relays a TCP communication between hosts. The network device holds a request rate and a first output rate indicative of an effective bandwidth for transferring data to a second network. The network device divides data from a first network into a plurality of connections a second network, and transfers the data between the hosts. The network device holds a second output rate for each of the divided connections. When the request rate is equal to or larger than the first output rate by a threshold value, and a relatively low-speed connection is detected among the plurality of connections of the second network, the network device conducts a communication with the use of a connection other than the relatively low-speed connection.

10 Claims, 27 Drawing Sheets

| LAN HOST IP | LAN HOST PORT | WAN HOST IP | WAN HOST PORT | THE NUMBER OF DIVIDED CONNECTIONS | SUBJECT PORT ARRAY | | THE OTHER PORT ARRAY |
|---|---|---|---|---|---|---|---|
| 2.3.4.5 | 8013 | 1.2.3.4 | 80 | 2 | 8013 | 10129 | 4759 |
| ... 15002 | ... | ... | ... | ... | ... | | |

| LAN HOST IP | LAN HOST PORT | WAN HOST IP | WAN HOST PORT | REQUEST RATE ARRAY | | | OUTPUT RATE ARRAY | | | OUTPUT RATE ARRAY PER CONNECTION | | | LAST MONITORING TIME |
|---|---|---|---|---|---|---|---|---|---|---|---|---|---|
| 2.3.4.5 | 8013 | 1.2.3.4 | 80 | 29 | ... | 0 | 12 | ... | 0 | 12 | 12 | 12 | 2011/03/19, 08:45:36 |
| ... | ... | ... | ... | ... | ... | ... | ... | ... | ... | ... | | | ... |

FIG. 17

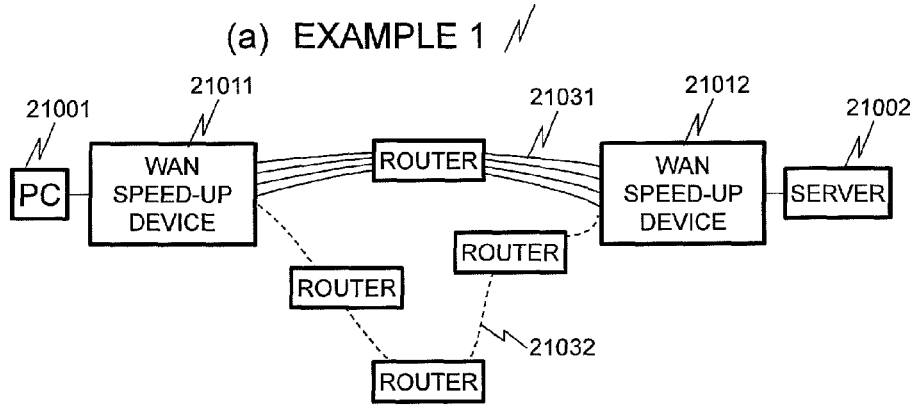
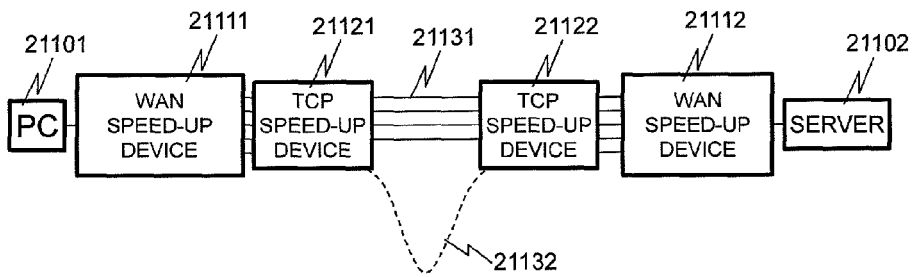
FIG. 21

NETWORK DEVICE, METHOD FOR CONTROLLING THE NETWORK DEVICE, AND NETWORK SYSTEM

CLAIM OF PRIORITY

The present application claims priority from Japanese patent application JP 2012-246572 filed on Nov. 8, 2012, the content of which is hereby incorporated by reference into this application.

BACKGROUND OF THE INVENTION

1. Field of the Invention

The present invention relates to a network device, a method for controlling the network device, and a network system, and more particularly to a network device, a method for controlling the network device, and a network system which multiplex TCP on a proxy device to speed up a communication.

2. Description of the Background Art

When a plurality of information communication devices communicate with each other, a transmission control protocol (TCP) defined by RFC 793 ("TRANSMISSION CONTROL PROTOCOL, DARPA INTERNET PROGRAM, PROTOCOL SPECIFICATION", pages 3-6, sec. 1.5, "Flow Control", http://datatracker.ietf.org/doc/rfc793) is generally used. The TCP is substantially a standard protocol on the internet, and installed in a large number of communication devices. With the use of the TCP, the information communication devices can communicate with each other regardless of the type of the information communication devices.

[WAN Speed-Up Device]

However, when a communication is conducted between a data center and a hub through a wide area network (WAN), an effective bandwidth is bottlenecked by a delay of the WAN from the restrictions of a flow control of the TCP, as a result of which even if a contracted bandwidth of the WAN is widened, the speed-up effect may not be obtained. Under the circumstance, there has been proposed a TCP speed-up technique for improving the flow control of the TCP in a network proxy device (device executing a communication by proxy). Also, the speed-up device of this type is called "WAN speed-up device".

For example, JP-A-2003-69615 pertaining to a flow control improvement of the TCP discloses that "One or more routers 70a and 70b are arranged between a source host 50 and a destination host 60. The router 70a generates and transmits an acknowledge packet responsive to a packet transmitted from the source host 50, and terminates and divides a connection between the source host 50 and the destination host 60. An address of the destination host is used for a start address of the acknowledge packet. Also, a packet whose start address is an address of the source host is brought to the destination host 60. As a result, both of those hosts are made to recognize one virtual connection." (refer to "technical solution").

[Device for Transmitting TCP in a Lump]

Also, as another technical solution to the problem that the effective bandwidth is not obtained from the restrictions of the flow control of the TCP when a communication is conducted between the data center and the hub through the wide area network, there has been proposed a method for changing a communication control system of a transmitter side communication terminal, and multiplexing the TCP.

For example, JP-A-2004-260668 discloses that "There is provided a moving image transmission system including a transmitting device that transmits moving image data required to be reproduced in real time by TCP/IP, and a receiving device that receives the data transmitted from the transmitting device. The transmitting device transmits divided image data obtained by further dividing individual unit image data with one frame or a plurality of frames of the moving image data as one unit through a plurality of TCP connections, and the receiving device has a buffer part that proceeds with the processing for returning the divided image data received through the plurality of TCP connections to the original unit image data, and storage of the moving image data for the plurality of frames, and determines the division number of unit image data, and the number of TCP connections on the basis of a throughput per one TCP connection and an average bit rate of the moving image data." (refer to "technical solution").

Further, a method for applying the TCP multiplexing to proxy is also provided. For example, in US2005/025150 (Accelerating Network Performance by Striping and Parallelization of TCP Connections), "The Proxy application running on network accelerator 14-1 then assigns one or more of the persistent connections it has with the network accelerator 14-2 to handle the connection requested by Machine A." is disclosed (refer to paragraph [0031] in "Detailed Description of the Invention").

SUMMARY OF THE INVENTION

In the related art WAN speed-up device, in order to execute an arrival acknowledge by proxy, the proxy device is provided with a flow control window larger than that of clients, and the window is not used up even if the delay is somewhat long. However, in this system, because the window is used up under the circumstance where the delay is larger than an assumed delay, there still arises such a first problem that a sufficient bandwidth is not obtained from the restrictions of the flow control of the TCP.

Accordingly, a first object of the present invention is to provide a WAN speed-up device that can sufficiently speed up a communication of the TCP.

Also, in the related art technique for changing the communication control system of the transmitter side communication terminal, there is a need to change the communication control system of all the sever terminals and the client terminals under the existing environment configured by the server client system, resulting in such a second problem that the introduction of the above system into the existing environment is difficult.

Accordingly, a second object of the present invention is to provide a WAN speed-up device that can multiplex the TCP in a proxy device that can be easily introduced into the existing environment.

Also, in an example where the related art TCP multiplexing method is applied to the proxy device, when receiving a connection establishment request from the client, the connection divided into an appropriate division number, and subjected to the TCP multiplexing is established. However, because the number of multiplexing is statically determined according to a status at the time of requesting the connection establishment, there arises such a third problem that it is difficult to always conduct an appropriate control according to the status of the network.

Accordingly, a third object of the present invention is to provide a WAN speed-up device that can multiplex the TCP which can dynamically control the number of multiplexing of the TCP according to the status of the network.

Also, in an example in which the related art TCP multiplexing method is applied to the proxy device, even if a WAN bandwidth is not used up, there arises such a fourth problem that a communication between the server and the client is not speeded up even though a communication between the proxy devices is multiplexed.

For example, the present inventors have found that when at least one of a plurality of multiplexed TCP connections is lower in speed than the other connections, it is difficult to speed up the communication between the server and the client with being bottlenecked by the speed of the low-speed connection.

FIG. 20 illustrates an example of the proxy device employing the TCP multiplexing method in a state where the above fourth problem arises. A proxy device 20001 having a TCP division function divides, for example, one TCP connection 20011 into five TCP connections 20012 to 20016, and FIG. 20 illustrates a state at a certain time point of a receiver side. In the present specification, for convenience of description, the TCP connection 20011 before being divided (or after having been combined) is called "parent connection", and the TCP connections 20012 to 20016 after having been divided (or before being combined) are called "child connections". The child connections 20012 to 20016 have receiver buffers 20022 to 20026, respectively, and the parent connection has a receiver buffer 20021 that bundles the receiver buffers 20022 to 20026 of the child connections. In this example, when the patent connection 20011 is restored from the divided child connections 20012 to 20016, there is a need to merge and sort data divided into the child connections by some means. However, as illustrated in FIG. 20, one or a plurality of child connections (20016 in this example) pass through a different path on a network, and are relatively low in speed as compared with the other child connections, data arrival at the receiver buffer 20026 of the low-speed child connection 20016 is delayed, and the merge and sort processing is stalled. As a result, for example, when a piece of data is allocated to the child connections from the parent connection in a round-robin fashion, a speed-up of the parent connection is prevented. Also, even if the allocation of the data piece from the parent connection to the child connections is not conducted in the round-robin fashion, data arrives at the buffers 20022 to 20025 of the relatively high-speed child connections while waiting for data arrival at the receiver buffer 20026. Therefore, there is a need to increase the sizes of the buffers 20022 to 20025 of the relatively high-speed child connections. However, because a buffer memory resource is finite, the buffers 20022 to 20025 cannot be increased blindly. As a result, for example, packets that cannot be entered into, for example, the buffers 20022 to 20025 are delayed to prevent the speed-up of the parent connection. The inventors have found that there arises such a fourth problem that even if the WAN bandwidth is not thus used up, there is a case where the communication between the server and the client is not speeded up even though the communication between the proxy devices is multiplexed.

Accordingly, the fourth problem to be solved by the present invention is to provide the WAN speed-up device that can speed up the communication between the client and the server when the WAN bandwidth is not used up.

As described above, the present invention aims at providing a network device, a method for controlling the network device, and a network system which can speed up a communication of the TCP.

The present invention includes a plurality of technical solutions, and according to one example of those solutions, there are provided a storage area A that holds the respective moving averages of the request rate for each TCP connection, and the output rate at which transfer to the network could be conducted, and a storage area B that holds the number of divided connections for each connection requested by the host, and identification information on each of the divided connections and the respective moving averages of the output rate at which transfer to the network could be conducted. The request rate and the output rate in the storage area A are compared with each other according to a rule of a user definition or a system definition, and the number of divided connections is increased or decreased as the occasion demands. When the number of divided connections is increased, a new TCP connection C starts, and the number of divided connections in the storage area B, and the identification information on the connection C are updated. When the number of divided connections is decreased, an arbitrary TCP connection D is acquired from the storage area B, the TCP connection D is terminated, and the number of divided connections and the identification information on the connection C in the storage area B are updated. The standard deviations of the output rates of the respective connections divided for each connection requested by the host are compared with each other according to the rule of the user definition or the system definition to detect a relatively low-speed connection, the use of the relatively low-speed connection stops as occasion demands, and in this situation, an arbitrary TCP connection D is acquired from a storage area B, the TCP connection D is completed, the number of divided connections in the storage area B, and the identification information of the connection C are updated and controlled.

With the above configuration, in this WAN speed-up device, because a flow control window larger than the client is not used, the first problem is solved. Also, the proxy device can be applied to the system without changing the communication control system of the server terminal and the client terminal which are placed under the existing environments to solve the second problem. Also, the number of divisions can be changed according to the output rate when the TCP communication between the proxy devices is multiplexed to solve the third problem. Also, when the WAN bandwidth is not used up, the communication of the TCP between the client and the server can be sufficiently speeded up to solve the fourth problem.

According to the first solving means of the present invention, there is provided a network device that relays a TCP communication through a first network and a second network between a first host and a second host, comprising:

a first storage area that holds a request rate based on the amount of data input from the first network, and a first output rate indicative of an effective bandwidth for transferring data to the second network;

a connection division coupling unit that divides, for the TCP connection between the first and second hosts, the data from the first network into a plurality of connections established with respect to a counter network device of the second network, and transfers the data, and couples the data through the plurality of connections from the second network, and transfers the data to the first network; and a second storage area that holds a second output rate for each of the divided connections, wherein the connection division coupling unit conducts a communication with the use of a connection other than a relatively low-speed connection among the plurality of connections of the second network, or with reducing a use rate of the relatively low-speed connection, when the request rate is larger than the first output rate by a predetermined threshold value or larger, and the relatively low-speed connection having the second output rate equal to or larger than a given speed is detected from the plurality of connections of the second network.

According to the second solving means of the present invention, there is provided a method for controlling a network device that relays a TCP communication through a first network and a second network between a first host and a second host, including:

storing a request rate based on the amount of data input from the first network, and a first output rate indicative of an effective bandwidth for transferring data to the second network in a first storage area;

dividing, for the TCP connection between the first and second hosts, the data from the first network into a plurality of connections established with respect to a counter network device of the second network, and transferring the data, and coupling the data through the plurality of connections from the second network, and transferring the data to the first network;

storing a second output rate for each of the divided connections in a second storage area; and conducting a communication with the use of a connection other than a relatively low-speed connection among the plurality of connections of the second network, or with reducing a use rate of the relatively low-speed connection, when the request rate is larger than the first output rate by a predetermined threshold value or larger, and the relatively low-speed connection having the second output rate equal to or larger than a given speed is detected from the plurality of connections of the second network.

According to the third solving means of the present invention, there is provided a network system in which a first host and a second host communicate with each other through a wide area network, the network system comprising:

a first network device according to the above which is arranged on the first host side; and a second network device according to the above which is arranged on the second host side, wherein the first network device and the second network device are arranged through the wide area network, and the first host and the second host communicate with each other through a connection divided on the basis of an effective bandwidth of the wide area network.

It is possible, according to the present invention, to provide a network device, a method for controlling the network device, and a network system which can speed up a communication of the TCP.

BRIEF DESCRIPTION OF THE DRAWINGS

FIG. 3 is a diagram illustrating an example of a schema and a record in a connection division number DB according to the first embodiment;

FIG. 17 is a diagram illustrating an example of a schema and a record in a bandwidth DB according to a second embodiment;

FIG. 21 illustrates two examples in which a speed difference occurs between the child connections;

DETAILED DESCRIPTION OF THE INVENTION

Hereinafter, embodiments will be described with reference to the accompanying drawings.

First Embodiment

In this embodiment, a description will be given of an example of WAN speed-up devices 1011 and 1031 that equally speed up communications from, for example, all of terminals.

Figure 1:
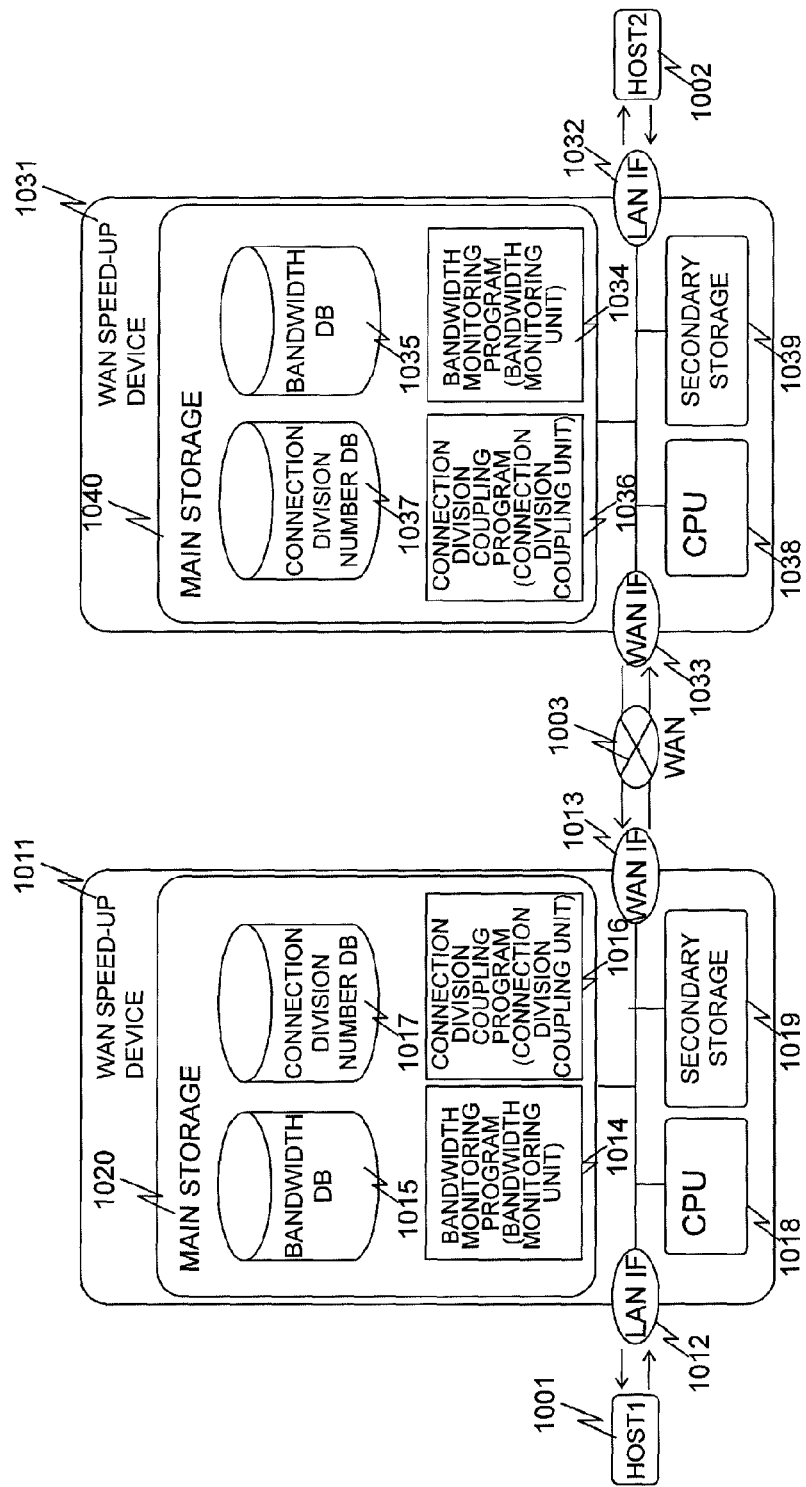
FIG. 1 is a diagram of an overall configuration according to a first embodiment.

FIG. 1 is an exemplary configuration diagram of a communication system using a WAN speed-up device according to this embodiment. In FIG. 1, two hosts (communication device, terminal) of a host 1 (1001) and a host 2 (1002) communicate with each other through a LAN (first network)

and a WAN (second network) (1003). On its path, the WAN speed-up devices (network devices) 1011 and 1031 operate as proxy devices. For example, the host 1 (1001) and the WAN speed-up device 1011 as well as the host 2 (1002) and the WAN speed-up device 1031 are installed physically close to each other, respectively, to reduce a network delay. The WAN speed-up device 1011 (and 1031) has a LAN interface 1012 (and 1032) and a WAN interface 1013 (and 1033) as external input and output. Also, in order to operate programs, the WAN speed-up device 1011 (and 1031) includes a CPU 1018 (and 1038), a main storage (main memory, main storage unit) 1020 (and 1040), and a secondary storage (secondary memory, secondary storage unit) 1019 (and 1039). The LAN interface 1012 (and 1032) and the WAN interface 1013 (and 1033) each have a buffer of a first in first out (FIFO, data first input is first output) system of about several KB to several MB. For that reason, the main storage 1020 (and 1040) can read data as large as a buffer size at a maximum from the LAN interface 1012 (and 1032) and the WAN interface 1013 (and 1033). Programs and databases (DB) are saved in the secondary storage 1019 (and 1039), and the programs and the DB are read by the main storage 1020 (and 1040) after the WAN speed-up device 1011 (and 1031) has started, and operated by the CPU 1018 (and 1038).

In the first embodiment, the programs include a bandwidth monitoring program 1014 (and 1034), and a connection division coupling program 1016 (and 1036). Hereinafter, a description will be given of a block in which the CPU 1018 (and 1038) executes and realizes the bandwidth monitoring program as the bandwidth monitoring unit 1014 (and 1034), and a block in which the CPU 1018 (and 1038) executes and realizes the connection division coupling program as the connection division coupling unit 1016 (and 1036). A control TCP connection is established between the two connection division coupling units 1016 and 1036 in advance. For example, the TCP connection can be distinguished from other connections by a method using, for example, a specific port No. or a specific IP address.

The main storage 1020 (and 1040) includes a bandwidth DB (first storage area) 1015 (and 1035), and a connection division number DB (second storage area) 1017 (and 1037). The bandwidth DB 1015 (and 1035) holds respective moving averages of a request rate for each of the TCP connections, and an output rate at which transfer to the network could be conducted.

Figure 2:
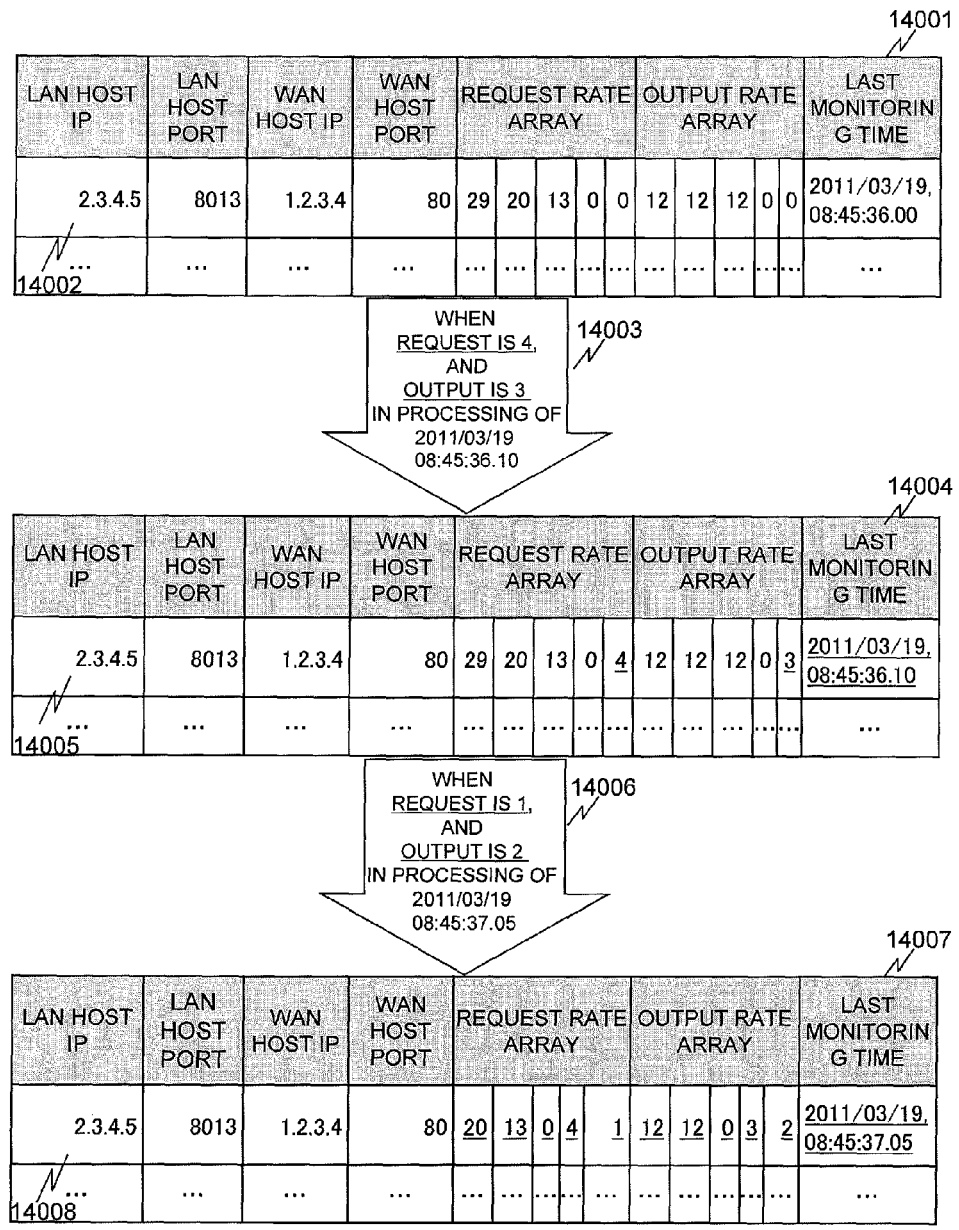
FIG. 2 is a diagram illustrating an example of a schema and a record in a bandwidth DB according to the first embodiment.

Referring to FIG. 2, a table 14001 illustrates an example of a schema and a record in the bandwidth DB 1015 (and 1035). The schema in the table 14001 combines four columns of a LAN host IP column, a LAN host port column, a WAN host IP column, and a WAN host port column together to distinguish the TCP connections from each other. That is, the table 14001 can search a row (entry) corresponding to a specified TCP connection. Also, in order to take, for example, a moving average of the request rates and the output rates for last 5 seconds, the table 14001 has an array structure of holding previous five values of the request rates and the output rates, and further holds a last monitoring time. In this embodiment, an acquisition period of the moving average is set to 5 seconds, but the acquisition period other than 5 seconds may be used as a value of a system definition or a user definition. Also, the obtained moving average may be further stored.

The request rate is, for example, the amount of data input within a unit time, or a value based on the amount of data. Also, the output rate represents, for example, an effective bandwidth at which the data is transferred within a unit time. A method for updating a request rate array and an output rate array of the bandwidth DB 1015 (and 1035) will be described with reference to FIG. 2. An example in which the request rate and the output rate of a connection held on a row 14002 is used. At the row 14002, the last monitoring time is 2011/03/19, 08:45:36.00, and the request rate array represents that the request rate of 4 seconds ago, that is, for one second (unit time) from 2011/03/19, 08:45:32.00 is 29, the request rate of 3 seconds ago, that is, for one second from 2011/03/19, 08:45:33.00 is 20, likewise, the request rate of 2 seconds ago for one second is 13, the request rate of 1 second ago for one second is 0, and the request rate at present, that is, for one second from 2011/03/19, 08:45:36.00 is 0. Likewise, the output rate array represents that the output rate of 4 second ago for one second is 12, the output rate of 3 second ago for one second is 12, the output rate of 2 seconds ago for one second is 12, the output rate of 1 second ago for one second is 0, and the output rate at present for one second is 0. Several rate units are conceivable. In this embodiment, KB/sec is used, but other units, such as the number of packets/sec, may be used. Last one column of each of the request rate and the output rate arrays, that is, the output rate for one second from 2011/03/19, 08:45:36.00 does not represent the rate for one second because one second is not strictly elapsed, but called "rate for one second" for convenience in this example.

When the request of processing at 2011/03/19, 08:45:36.10 from this state is 4 KB, and the output thereof is 3 KB (14003), the table 14001 is changed to a table 14004. In this example, as indicated by a row 14005 corresponding to the row 14002, the last one column of the request rate array is updated to 0+4, that is, 4 KB, the last one column of the output rate array is updated to 0+3, that is, 3 KB, and the last monitoring time is updated to the present time, that is, 2011/03/19, 08:45:36.10. Thus, the last one column of each of the request rate and the output rate arrays is appropriately incremented, and the rate for one second is counted.

Subsequently, when the request of processing at 2011/03/19, 08:45:37.05 from this state is 1 KB, and the output thereof is 2 KB (14006), the table 14004 is changed to the table 14006. In this example, because a unit of second of the time is changed from 36 seconds to 37 seconds, both arrangements of the request rate and the output rate are shifted. Specifically, as indicated by a row 14008 corresponding to the row 14005, all of the values are shifted to the left by one, and on the respective last columns, that is, columns representing the present 1 second, the present request is 1 KB, and the present output is 2 KB. The request rate array and the output rate array of the bandwidth DB 1015 (and 1035) are updated as described above, and managed by, for example, the bandwidth monitoring unit 1014 (and 1034).

The connection division number DB 1017 (and 1037) holds the number of divided connections for each connection requested by the host, and identification information on each of the divided connections.

FIG. 3 illustrates a table 15001 of an example of the schema and the record in the connection division number DB 1017 (and 1037). The schema in the table 15001 combines four columns of a LAN host IP column, a LAN host port column, a WAN host IP column, and a WAN host port column together to distinguish the TCP connections from each other. Also, the number of divided connections between the WAN speed-up devices 1011 and 1031 is held in a column of the connection division number, and both-end port No. of each divided connection is held in a subject port array and the other port array. In this embodiment, when a connection between the WAN speed-up devices 1011 and 1031 is divided, the number of ports used in one WAN speed-up device is controlled to be always one. In this record, the number of ports on the other port side is set to one. For example, the connection division coupling unit 1016 (and 1036) updates the connection division number DB 1017 (and 1037) for management.

Figure 4:
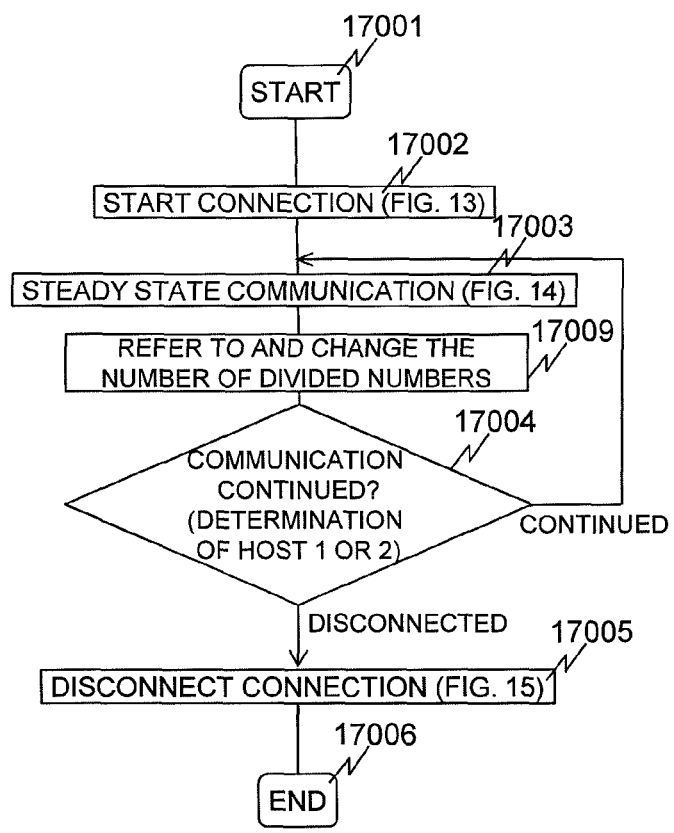
FIG. 4 is a flowchart from a connection start to a connection end.

FIG. 4 illustrates a flow from a connection start to a connection end between the host 1 (1001) and the host 2 (1002).

When the host 1 (1001) or the host 2 (1002) starts a communication (17001), connection start processing (17002) is first conducted to establish a connection between the host 1 (1001) and the host 2 (1002) through the WAN speed-up devices 1011 and the 1031. The details of this processing will be described with reference to FIG. 13. Subsequently, steady state communication processing (17003) is conducted between the host 1 (1001) and the host 2 (1002) to transfer data between the host 1 (1001) and the host 2 (1002). This processing is bidirectionally communicable. That is, a communication from the host 1 (1001) to the host 2 (1002), and a communication from the host 2 (1002) to the host 1 (1001) are conducted regardless of which host starting the connection in step 17002. The details of this processing will be described with reference to FIG. 14. Thereafter, it is determined whether the communication is continued, or not, in the host 1 (1001) or the host 2 (1002) (17004). If continued, the flow returns to the steady state communication (17003), and if disconnected, connection disconnection processing (17005) is conducted, and the connection is terminated (17006). The determination (17004) and the connection disconnection processing (17005) may be conducted by any one of the host 1 (1001) and the host 2 (1002) without depending on which host starts the connection in Step 17002. The details (17005) of the connection disconnection processing are illustrated in FIG. 15.

Also, the WAN speed-up devices 1011 and 1031 periodically conduct a change necessity determination and change (17009) of the connection division number in the WAN speed-up devices 1011 and 1031. In the drawing, this step is illustrated in the flow from the connection start to the connection end, but may be asynchronous with those processing. This determination is conducted by, for example, the WAN speed-up device connected to the host that starts the connection. That is, when the host 1 (1001) starts the connection, the WAN speed-up device 1011 conducts the determination, and when the host 2 (1002) starts the connection, the WAN speed-up device 1031 conducts the determination. As a result of the determination, if the change is necessary, connection division number change processing is conducted. The number of divided connections in the steady state communication (17003) is changed by this processing.

(Operation Flowchart)

Subsequently, the installation of the bandwidth monitoring unit and the connection division coupling unit will be described with reference to flowcharts of FIGS. 5 to 12. The following description of the flowchart will be conducted mainly on the respective blocks such as the bandwidth monitoring unit 1014 and the connection division coupling unit 1016 of the WAN speed-up device 1011. The same is applied to the bandwidth monitoring unit 1034 and the connection division coupling unit 1036 in the WAN speed-up device 1031.

Figure 5:
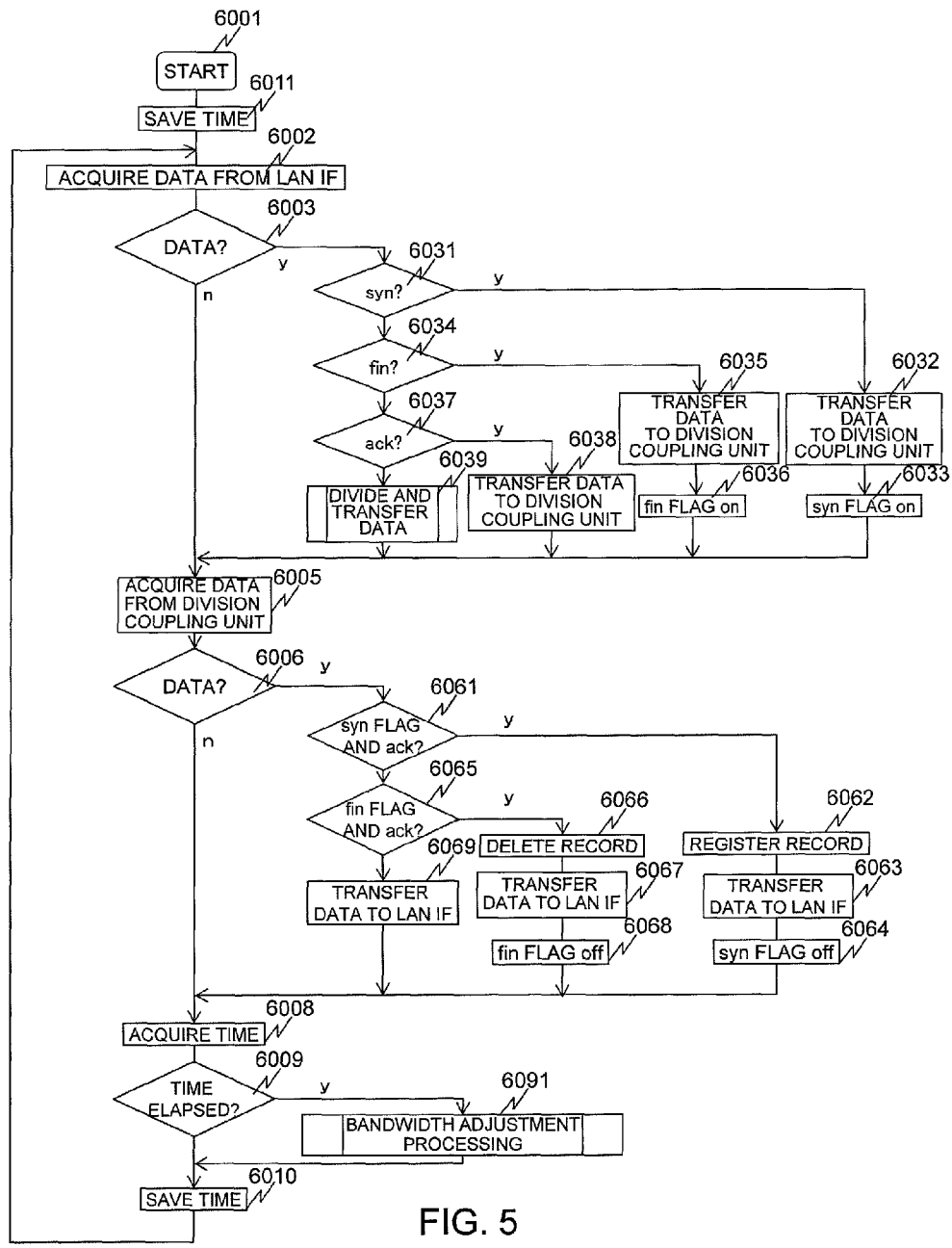
FIG. 5 is a flowchart illustrating a bandwidth monitoring part according to the first embodiment.

FIG. 5 is a flowchart of the bandwidth monitoring unit. After the processing starts (6001), the bandwidth monitoring unit 1014 saves the present time in a variable old_time (6010). Thereafter, the bandwidth monitoring unit 1014 acquires data from the LAN interface (6002), and conducts processing (6003 to 6039) corresponding to the data. Subsequently, the bandwidth monitoring unit 1014 acquires data from the connection division coupling unit 1016 (6005), and conducts processing corresponding to the data (6006 to 6069), and acquires a time (6008) to conduct bandwidth adjustment processing (6009, 6091). The bandwidth monitoring unit 1014 repeats the above loop. Hereinafter, the details of the respective processing will be described. The respective processing is executed by the bandwidth monitoring unit 1014.

After having acquired data from the LAN interface (6002), it is first determined whether the data has been acquired, or not (6003). For example, if no data is accumulated in a buffer of the LAN interface, no data cannot be acquired, and it is determined that the processing further proceeds. If data is present, the processing proceeds on the basis of determination of whether the data is syn (6031), fin (6034), ack (6037), or others. The processing when the data is syn (6031, 6032, 6033) corresponds to message receptions 2001 and 2011 which will be described later, and a flag (syn flag) is so set to wait for a response from the connection division coupling unit 1016 after the received message has been transferred to the connection division coupling unit 1016. The processing when the data is fin (6034, 6035, 6036) corresponds to a message reception 4001 which will be described later, and a flag (fin flag) is so set to wait for a response from the connection division coupling unit 1016 after the received message has been transferred to the connection division coupling unit 1016. The processing when the data is ack (6037, 6038) corresponds to message receptions 2021, 3024, 4011, and 4031 which will be described later, and the received messages are transferred. Other processing correspond to a message reception 3001 which will be described later, and in this case, division transfer (6039) in FIG. 6 is conducted.

Subsequently, after the data has been acquired from the connection division coupling unit 1016 (6005), it is first determined whether the data could be acquired, or not (6006). If the data is present, the processing proceeds on the basis of the determination of whether the syn flag is raised, and ack has been received, or not (6061), whether the fin flag is raised, and ack has been received, or not (6065), and whether other cases are applied, or not. If the syn flag is raised, and ack has been received (6061, 6062, 6063, 6064), the processing corresponds to message receptions 2015 and 2025 which will be described later, a new record is registered in the bandwidth DB 1015, the data is transferred to the LAN interface 1012 (6063), and the syn flag is lowered. If the fin flag is raised, and ack has been received (6065, 6066, 6067, 6068), the processing corresponds to message receptions 4015 and 4035 which will be described later, the record of an appropriate connection is deleted from the bandwidth DB 1015, the data is transferred to the LAN interface 1012 (6067), and the fin flag is lowered. In other cases, the processing corresponds to message receptions 2005, 3011, 3022, 4004, and 4024 which will be described later, and the data is transferred to the LAN interface 1012 (6069).

Figure 10:
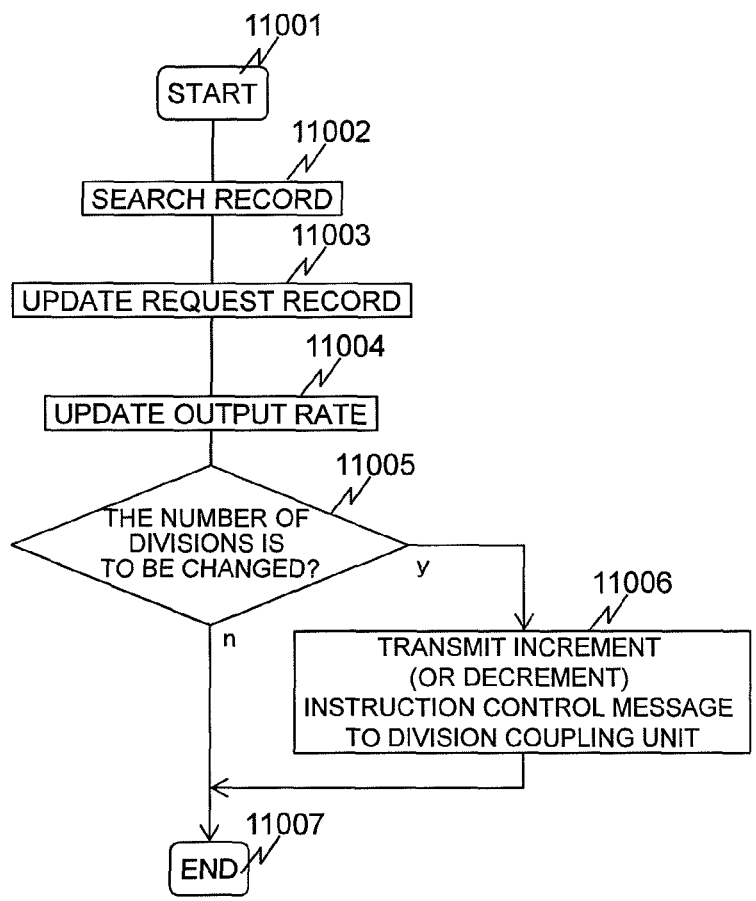
FIG. 10 is a flowchart of bandwidth adjustment processing of the bandwidth monitoring part according to the first embodiment.

Subsequently, the present time is acquired (6008), and compared with the time saved in the variable old_time during the foregoing loop, and it is determined whether, for example, 1 sec or longer has been elapsed, or not (6009). If 1 sec or longer has been elapsed, bandwidth adjustment processing 6091 in FIG. 10 is conducted. Thereafter, the time acquired in Step 6008 is saved in the variable old_time, and the flow returns to Step 6002. A cycle in which the bandwidth adjustment processing is conducted may be an appropriate cycle other than 1 sec, or may be irregular.

Figure 6:
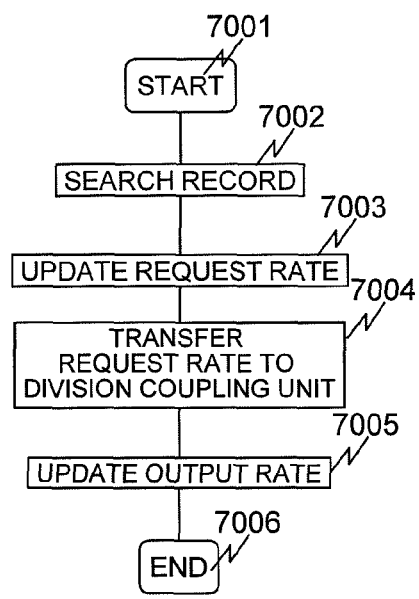
FIG. 6 is a flowchart illustrating division transmission processing of the bandwidth monitoring part according to the first embodiment.

FIG. 6 is a flowchart of the division transfer processing 6039 in the bandwidth monitoring unit. The respective processing is executed by the bandwidth monitoring unit 1014.

After the processing starts in the division transfer processing (7001), the bandwidth monitoring unit 1 (1014) searches the bandwidth DB 1015, and searches the record related to the connection that has received the data (7002). For example, the bandwidth monitoring unit 1 (1014) combines four columns of the LAN host IP column, the LAN host port column, the WAN host IP column, and the WAN host port column together to search the bandwidth DB 1015 on the basis of the respective data corresponding to the connections that have received the data, and searches the record related to the connection (3002).

Subsequently, the bandwidth monitoring unit 1 (1014) updates the request rate array of the record related to the connection and the last monitoring time (7003). For example, the last monitoring time is set to the present time, and the request rate array is determined on the basis of received data, for example, for last 1 sec.

Subsequently, the bandwidth monitoring unit 1 (1014) transfers a received packet train to the connection division coupling unit 1016 (7004). The transfer operation is influenced by the WAN interfaces 1013, 1033, and the WAN (1003) to change a required time. Subsequently, the bandwidth monitoring unit 1 (1014) measures the required time, updates the output rate array of the record related to the connection on the basis of the required time and the amount of transmitted data (7005), and terminates the processing (7006). As a result of this operation, the output rate of the connection is updated on the basis of, for example, a real amount of transmitted data (effective bandwidth).

Figure 7:
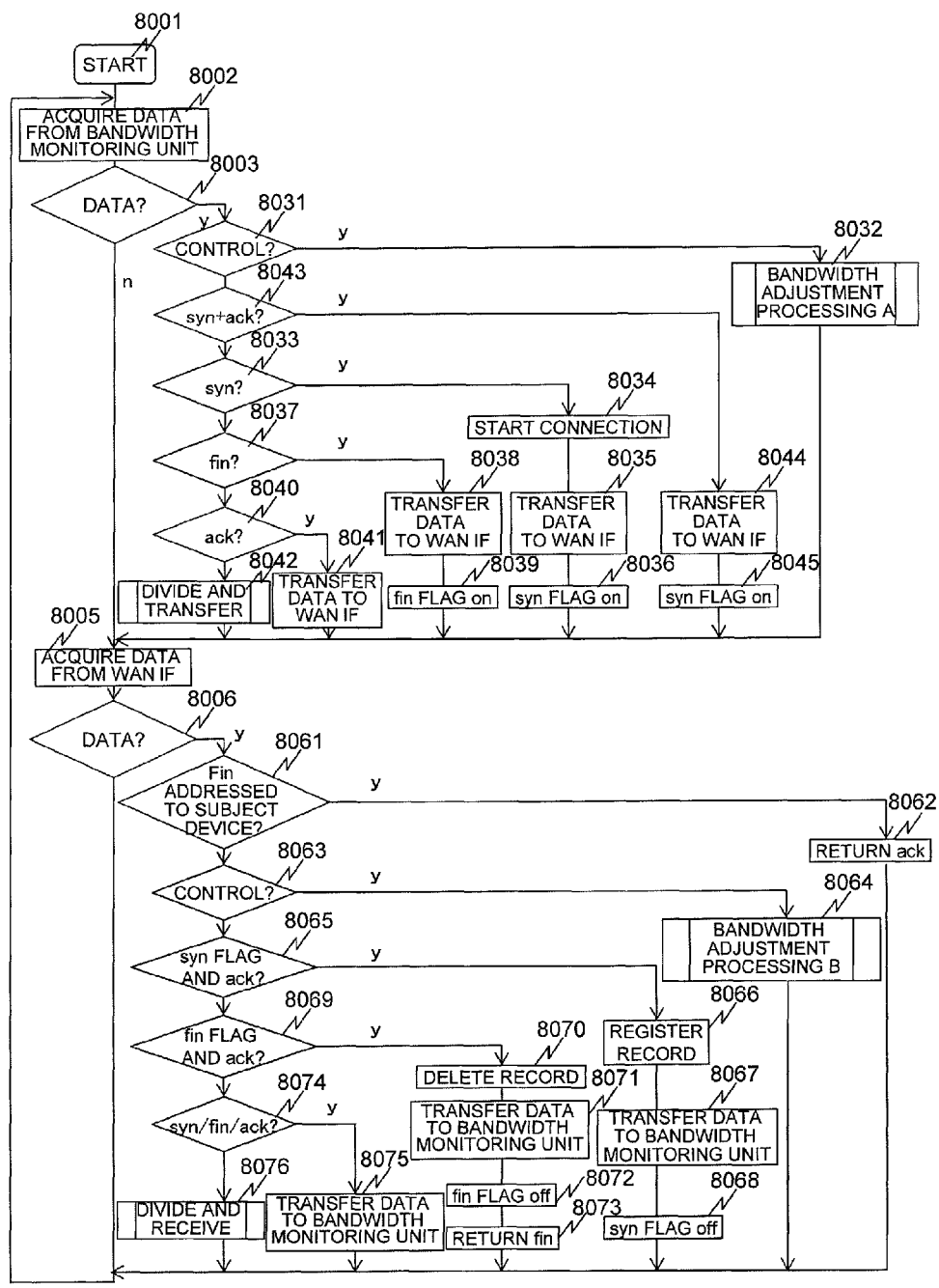
FIG. 7 is a flowchart of a connection division coupling part according to the first embodiment.

FIG. 7 is a flowchart of the connection division coupling unit. After the processing has started (8001), the connection division coupling unit 1016 acquires data from the bandwidth monitoring unit 1014 (8002) to conduct the processing corresponding to the acquired data (8003 to 8042), and subsequently acquires data from the WAN interface (8005) to conduct the processing (8006 to 8076) corresponding to the acquired data. The connection division coupling unit 1016 repeats the above loop. Hereinafter, the details of the respective processing will be described. The respective processing is executed by the connection division coupling unit 1016.

After having acquired the data from the bandwidth monitoring unit 1014 (8002), the connection division coupling unit 1016 first determines whether the data has been acquired, or not (8003). If the data is present, the connection division coupling unit 1016 proceeds with the processing on the basis of the determination of whether the data is a control message (8031), syn+ack (8043), syn (8033), fin (8037), ack (8040), or others. If the data is the control message (8031, 8032), the processing corresponds to a message reception 5005 which will be described later, and the connection division coupling unit 1016 conducts a bandwidth adjustment processing A (8032) of FIG. 11. If the data is syn+ack (8043, 8044, 8045), the processing corresponds to a message reception 2012 which will be described later, and the connection division coupling unit 1016 transfers the message to the WAN interface 1013, and raises the flag (syn flag) so as to wait for a response from the opposed connection division coupling unit 1036. If the data is syn (8033, 8034, 8035, 8036), the processing corresponds to a message reception 2002 which will be described later, and the connection division coupling unit 1016 transfers the message to the WAN interface 1013 after the connection has started, and raises the flag (syn flag) so as to wait for a response from the opposed connection division coupling unit 1036. If the data is fin (8037, 8038, 8039), the processing corresponds to message receptions 4003 and 4023 which will be described later, and the connection division coupling unit 1016 transfers the message to the WAN interface 1013 and raises the flag (fin flag) so as to wait for a response from the opposed connection division coupling unit 1036. If the data is ack, the processing corresponds to message receptions 2022, 4012, and 4032 which will be described later, and the connection division coupling unit 1016 transfers the message to the WAN interface 1013. In other cases, the processing corresponds to a message reception 3004 which will be described later, and the connection division coupling unit 1016 conducts division transfer processing 8042 of FIG. 8.

Subsequently, after having acquired the data from the WAN interface (8005), the connection division coupling unit 1016 first determines whether the data could be acquired, or not (8006). If the data is present, the connection division coupling unit 1016 proceeds with the processing on the basis of the determination of whether the data is the fin addressed to oneself (addressed to the subject device) (8061), the control message (8063), ack when the syn flag is raised (8065), ack when the fin flag is raised (8069), syn, fin or ack (8074), or others. If the data is the fin addressed to oneself (addressed to the subject device) (8061, 8062), the processing corresponds to message receptions 4016 and 4036 which will be described later, and the connection division coupling unit 1016 returns ack. If the data is the control message (8063, 8064), the processing corresponds to a message reception 5008 which will be described later, and the connection division coupling unit 1016 conducts a bandwidth adjustment processing B of FIG. 12 (8064). If the syn flag is raised, and the data is ack (8065, 8066, 8067, 8068), the processing corresponds to message receptions 2013 and 2023 which will be described later, the connection division coupling unit 1016 registers a new record in the connection division number DB 1017, and transfers the new record to the bandwidth monitoring unit 1014, and thereafter lowers the syn flag. If the fin flag is raised, and the data is ack (8069, 8070, 8071, 8072, 8073), the processing corresponds to message receptions 4013 and 4033 which will be described later, the connection division coupling unit 1016 deletes an appropriate record from the connection division number DB 1017, and transfers the record to the bandwidth monitoring unit 1014, and lowers the fin flag. Thereafter, the connection division coupling unit 1016 returns the fin to the opposed connection division coupling unit 1036. If the data is syn, fin, or ack (8074, 8075), the processing corresponds to processing 2004, 4003, and 4023 which will be described later, and the connection division coupling unit 1016 transfers the message to the bandwidth monitoring unit 1014. In other cases, the processing corresponds to a message reception 3008, and the connection division coupling unit 1016 conducts division receiving processing 8076 in FIG. 9.

Figure 8:
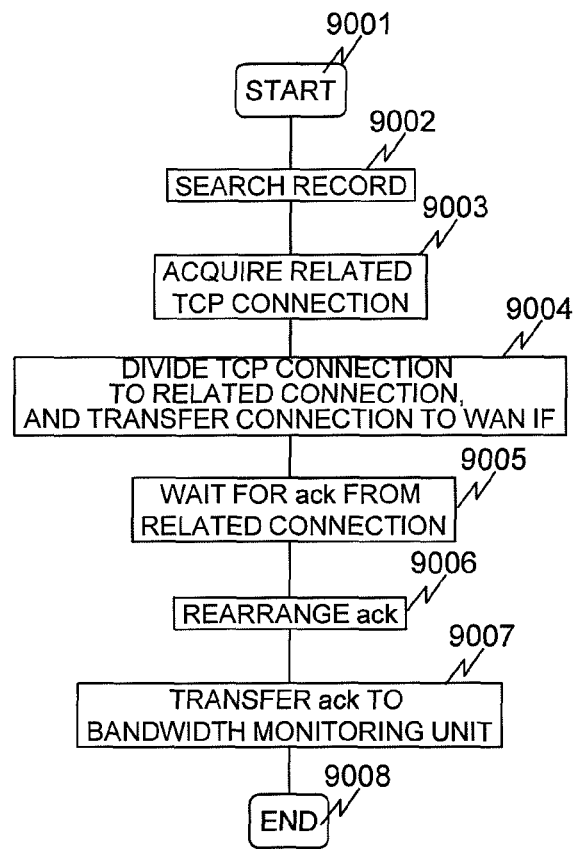
FIG. 8 is a flowchart of the division transmission processing of the connection division coupling part according to the first embodiment.

FIG. 8 is a flowchart of the division transfer processing 8042 of the connection division coupling unit. The respective processing is executed by the connection division coupling unit 1016.

In Step 9002, the connection division coupling unit 1016 searches the connection division number DB 1017 to acquire the record. For example, the connection division coupling unit 1 (1016) searches the connection division number DB 1017 by combination of four columns of the LAN host IP column, the LAN host port column, the WAN host IP column, and the WAN host port column together, and searches the record related to the appropriate connection (connection that receives the data).

Subsequently, the connection division coupling unit 1016 specifies and acquires one or a plurality of related TCP connections (9003). For example, the connection division coupling unit 1016 specifies the divided connections established with respect to the opposed WAN speed-up device 1031 according to the searched record. The connection division coupling unit 1016 divides data in a round-robin fashion with respect to those connections, and transfers the data (9004). For example, the connection division coupling unit 1 (1016)

divides the received packet train according to the connection division number column of the record related to the connection. As the division system, the round-robin or hash can be used. In this embodiment, the round-robin is applied for description. In the round-robin, packets are allowed to flow into the divided connections in order. The order of the divided connections is determined by, for example, sorting the combinations of the subject port array and the other port array in the connection division number DB 1017 in ascending order of numbers. For example, in the case of a record 15002 of the table 15001, a first connection is [8013-4759] in the combination of the ports, and a second connection is [10129-4759] in the combination of the ports.

Thereafter, the connection division coupling unit 1 (1016) waits for reception of ack (9005). The connection division coupling unit 1 (1016) sorts the received ack in sequence numerical order of the TCPs (9006), transfers the ack to the bandwidth monitoring unit 1 (1014) (9007), and terminates the processing. In this example, although an arrival order of ack is somewhat unsteady due to an influence of a congestion control of the TCP, ack is returned substantially in the packet transfer order. For that reason, sorting can be conducted if merge sorting is conducted every time data is acquired from the respective divided connections in the round-robin fashion.

Figure 9:
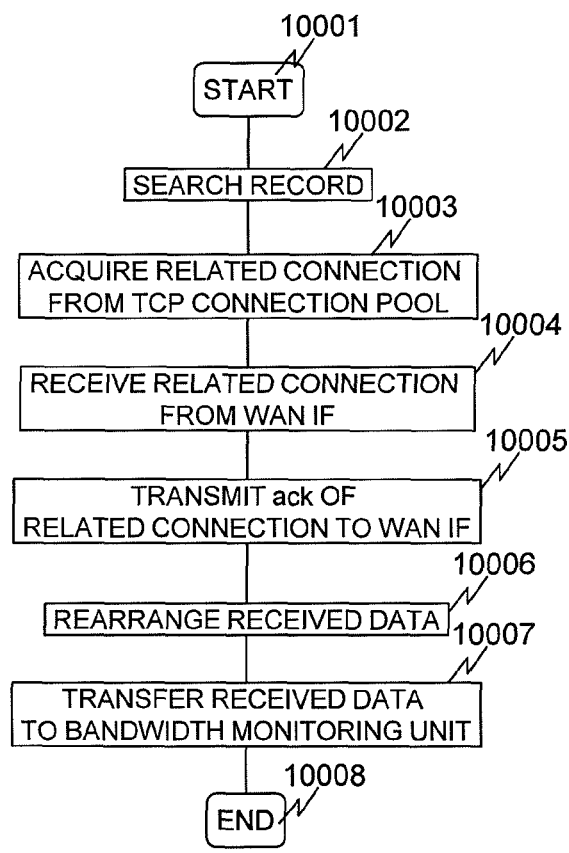
FIG. 9 is a flowchart of division receiving processing of the connection division coupling part according to the first embodiment.

FIG. 9 is a flowchart of division receiving processing of the connection division coupling unit.

After having searched the connection division number DB 1017 to acquire the record in Step 10002, the connection division coupling unit 1 (1016) specifies and acquires one or a plurality of related TCP connections (10003), and receives data from the TCP connections in the round-robin fashion (10004), and returns ack (10005). Thereafter, the connection division coupling unit 1 (1016) sorts the received data in the sequence numerical order of the TCP (10006), transfers the data to the bandwidth monitoring unit 1 (1014) (10007), and terminates the processing. Also, in the sort (10006), the merge sorting can be conducted in the same technique as that of the above-mentioned sort.

FIG. 10 is a flowchart of the bandwidth adjustment processing 6091 of the bandwidth monitoring unit.

In the bandwidth adjustment processing 6091, after the processing starts (11001), the bandwidth monitoring unit 1014 searches a certain record (arbitrary record) from the bandwidth DB 1015 (11002).

Then, the bandwidth monitoring unit 1014 updates the request rate array, the output rate array, and the last monitoring time within the record with the use of the present time, updates an average of the request rates (11003), and also updates an average of the output rates (11004). For example, the bandwidth monitoring unit 1014 updates the request rate array on the basis of the amount of received data, and updates the output rate array on the basis of the amount of transmitted data.

Subsequently, the bandwidth monitoring unit 1014 determines whether the number of divisions needs to be changed, or not (11005). In an example of the table 14001, the moving average of the request rates is 12.4 packets/sec, and the moving average of the output rates is also 7.2 packets/sec. Subsequently, it is determined whether the number of divisions needs to be changed, or not (5004). As an example, the bandwidth monitoring unit 1014 determines that if the request rate is larger than the output rate by 20% (first threshold value) or larger, there is a need to increment the number of divisions by one, and if the request rate is 0 packets/sec (second threshold value), there is a need to decrement the number of divisions by one. The bandwidth monitoring unit 1014 also determines that, in other cases, there is no need to increment or decrement the number of divisions. In this embodiment, the threshold value is set to 20% and 0 packets/sec. However, other threshold values may be used as a value of the system definition or the user definition. In the example of the table 14001, because the request rate is larger than the output rate by 20%, the bandwidth monitoring unit 1014 determines that there is a need to increment the number of divisions by one. If the number of divisions needs to be changed as a result of the determination, the bandwidth monitoring unit 1014 transmits an instruction for incrementing the number of divisions (a decrement instruction if the number of divisions is decreased) to the connection division coupling unit (11006). Thereafter, the bandwidth monitoring unit 1014 terminates the processing (11007).

Figure 11:
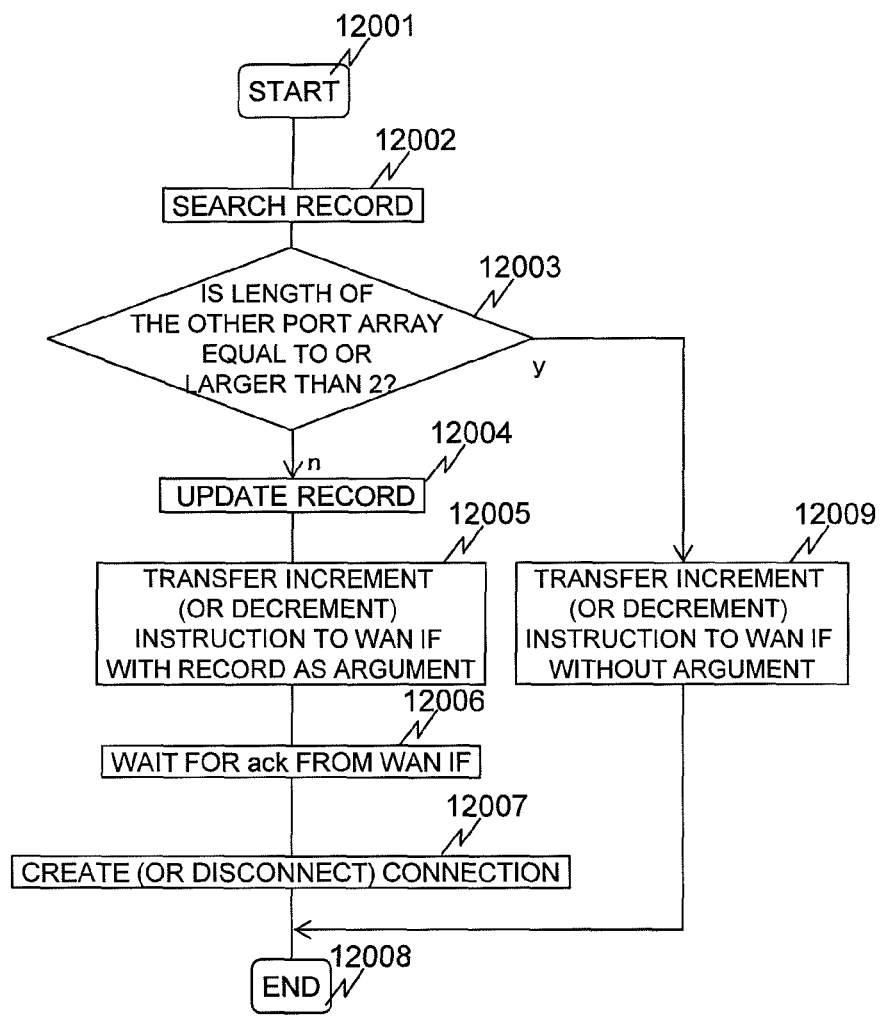
FIG. 11 is a flowchart of bandwidth adjustment processing A of the connection division coupling part according to the first embodiment.

FIG. 11 is a flowchart of the bandwidth adjustment processing A (8032) of the connection division coupling unit. For example, FIG. 11 is a flowchart when the increment instruction or the decrement instruction is received from the bandwidth monitoring unit.

The connection division coupling unit 1 (1016) searches the record related to the connection that receives the data with reference to the connection division number DB 1017 in the same manner as that described above (12002). In Step 12003, it is determined whether a length of the other port array is equal to or larger than 2, or not. The connection division coupling unit 1 (1016) updates the record (12004) unless the length of the other port array is equal to or larger than 2 (12003). For example, the control data is the increment instruction from the bandwidth monitoring unit 1 (1014), and the connection division coupling unit 1 (1016) increments a value of the connection division number column with respect to the record of the connection division number DB 1017, and adds a free port No. to the subject port array because the length of the other port array is, for example, 1.

Then, the connection division coupling unit 1 (1016) transmits the increment instruction to the connection division coupling unit 2 (1036) through the WAN interface 1013 with the contents of the record updated by the record update 12004 as an argument. In this example, the communication uses the control connection. The connection division coupling unit 1 (1016) waits for ack from the connection division coupling unit 2 (1036) through the WAN interface 1013 (12006). Thereafter, the connection division coupling unit 1 (1016), according to the message type received from the bandwidth monitoring unit, establishes a new TCP connection with respect to the connection division coupling unit 2 (1036) or disconnects the existing TCP connection (12007). Also, as described above, the port number of both ends of the TCP connection which is established or disconnected is, for example, as the recode updated in Step 12004.

Also, Step 12009 is the processing when the length of the other port array is equal to or larger than 2 (12003), and the connection division coupling unit 1 (1016) transmits the increment (or decrement) instruction of the argument to the connection division coupling unit 2 (1036) through the WAN interface 1013.

Figure 12:
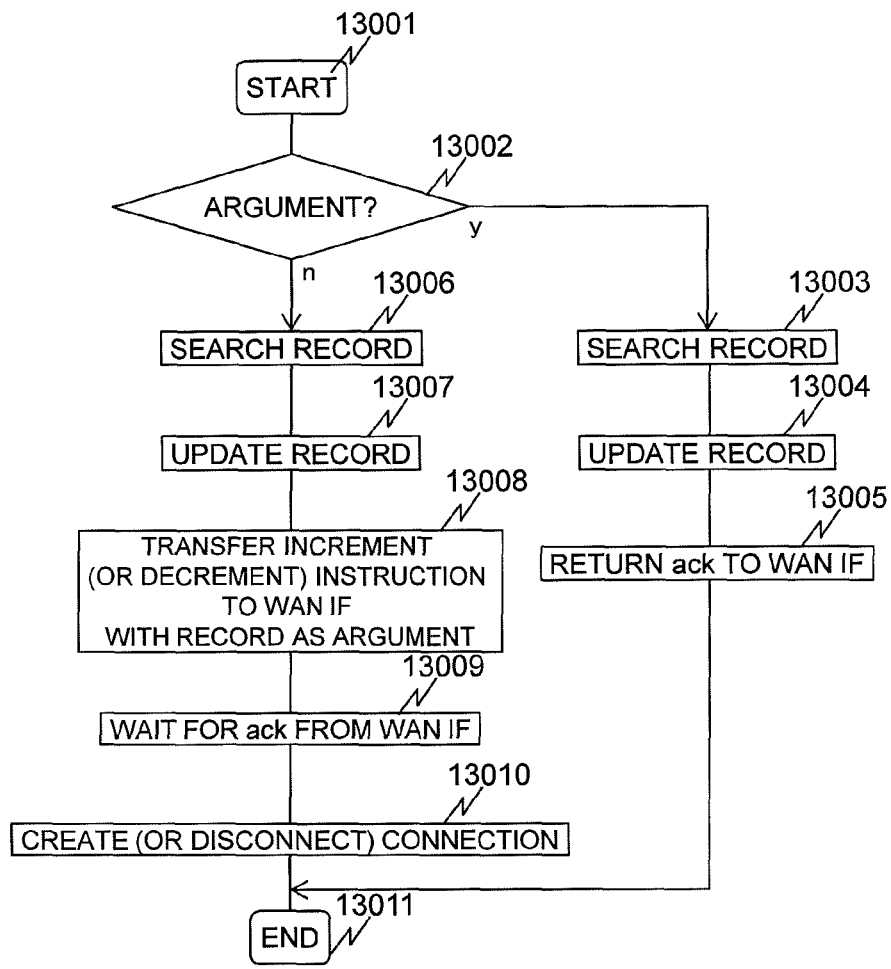
FIG. 12 is a flowchart of bandwidth adjustment processing B of the connection division coupling part according to the first embodiment.

FIG. 12 is a flowchart of the bandwidth adjustment processing B of the connection division coupling unit. For example, FIG. 12 is a flowchart when the increment instruction is received from the opposed connection division coupling unit.

In Step 13002, it is determined whether the argument is present in the received data (for example, increment instruction), or not, and if no argument is present, the connection division coupling unit 1 (1016) conducts Steps 13006 to 13010. These steps are identical with the above-mentioned Steps 12002, 12004 to 12007. That is, the increment (or decrement) processing is conducted oppositely.

On the other hand, if the argument is present (13002), the connection division coupling unit 1 (1016) conducts Steps 13003 to 13005. In Step 13003, the connection division coupling unit 1 (1016) searches the record related to the above connection, and updates the record according to the increment instruction (13004). For example, the connection division coupling unit 1 (1016) increments a value of the connection division number column. Also, the connection division coupling unit 1 (1016) returns ack to the WAN IF 1013 (13005).

(Operation Sequence)

Hereinafter, the details of the respective processing illustrated in FIG. 4 will be described with reference to sequence diagrams of FIGS. 13 to 16. In order to distinguish two bandwidth monitoring units from each other, the bandwidth monitoring unit 1014 is called "bandwidth monitoring unit 1", and the bandwidth monitoring unit 1034 is called "bandwidth monitoring unit 2". Also, in order to distinguish the two connection division coupling units from each other, the connection division coupling unit 1016 is called "connection division coupling unit 1", and the connection division coupling unit 1036 is called "connection division coupling unit 2". Further, in the drawing, the connection division coupling unit 1016 (and 1036) is abbreviated to "division coupling unit". Further, the TCP connection management method of the host 1 and the host 2 will not be described in detail because the existing method is used, and the WAN speed-up devices 1011 and 1031 inserted between the host 1 and the host 2, and the operation of their internal operation modules will be exclusively described.

Figure 13:
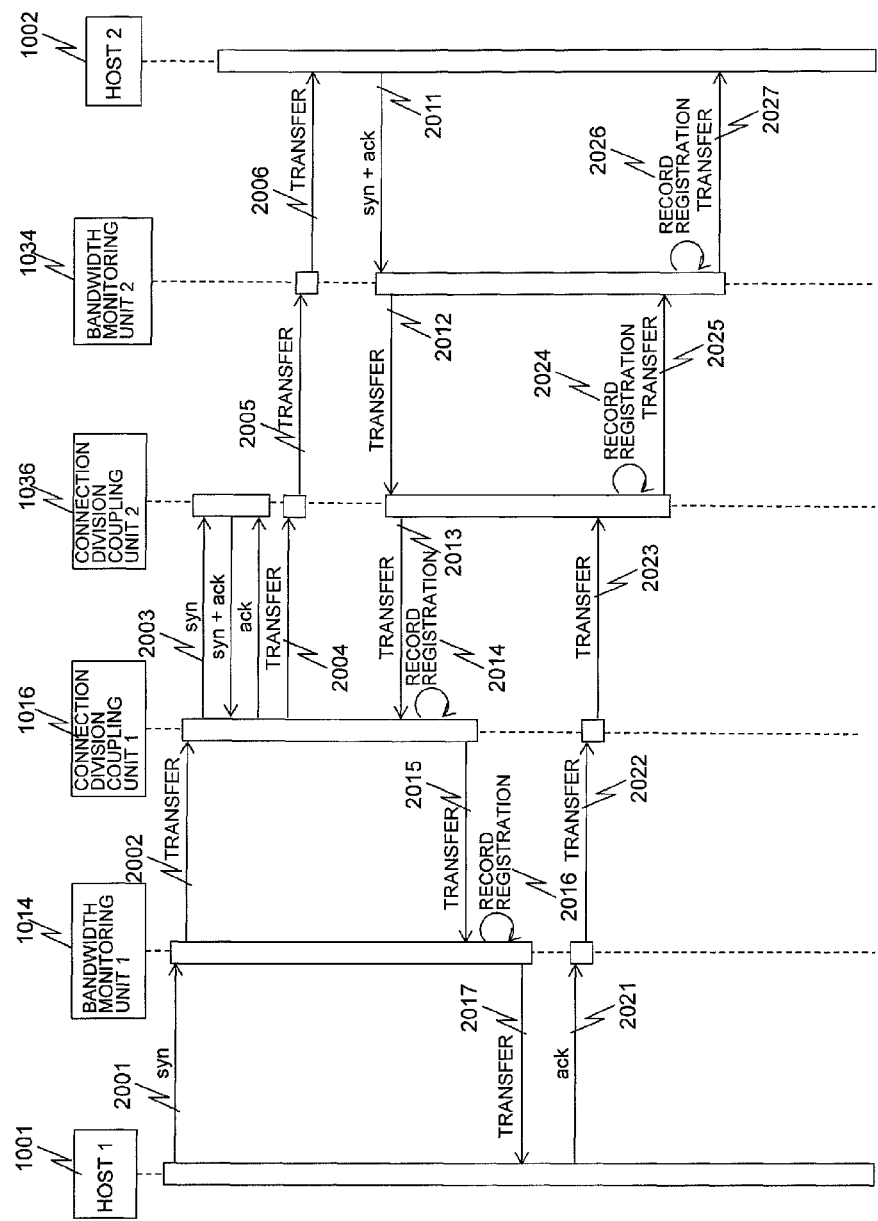
FIG. 13 is a diagram illustrating a connection start sequence according to the first embodiment.

FIG. 13 is a processing sequence example when a new TCP connection starts between the host 1 (1001) and the host 2 (1002). In this example, the host 1 (1001) starts the connection processing. In the connection start of the TCP, there is used a technique called "3-way handshake" in which a syn packet is transmitted from the host 1 to the host 2, the host 2 then returns a syn+ack packet to the host 1 responsive to the syn packet, and the host 1 further returns an ack packet to the host 2.

First, the host 1 (1001) transmits the syn packet to the bandwidth monitoring unit 1 (1014) through the LAN interface 1012 (2001). In this example, because the intervention of the LAN interface 1012 would be obvious, the LAN interface 1012 (and 1032) will be omitted in FIG. 13 and the description of the processing in this embodiment. Also, for the same reason, the WAN interface 1013 (and 1033) will be also omitted. The bandwidth monitoring unit 1 (1014) transfers the received syn packet to the connection division coupling unit 1 (1016) (2002), and waits for a response from the connection division coupling unit 1 (1016).

Subsequently, the connection division coupling unit 1 (1016) connects the TCP connection for a proxy communication with respect to the connection division coupling unit 2 (1036) (2003). Also, in this situation, the processing of the 3-way handshake is conducted. Thereafter, the connection division coupling unit 1 (1016) transfers the received syn packet to the connection division coupling unit 2 (1036) with the use of the connection connected in Step 2003 (2004), and waits for a response from the connection division coupling unit 2 (1036).

Subsequently, the connection division coupling unit 2 (1036) transfers the received syn packet to the bandwidth monitoring unit 2 (1034) (2005). Subsequently, the bandwidth monitoring unit 2 (1034) transfers the received syn packet to the host 2 (1002) (2006).

Then, the host 2 (1002) transmits the syn+ack packet to the bandwidth monitoring unit 2 (1034) (2011). The bandwidth monitoring unit 2 (1034) transfers the received syn+ack packet to the connection division coupling unit 2 (1036) (2012), and waits for a response from the connection division coupling unit 2 (1036). Subsequently, the connection division coupling unit 2 (1036) transfers the received syn+ack packet to the connection division coupling unit 1 (1016) that waits for the response with the use of the connection connected in Step 2003 (2013), and waits for a response from the connection division coupling unit 1 (1016). Subsequently, the connection division coupling unit 1 (1016) registers the record related to the above connection in the connection division number DB 1017 (2014), transfers the received syn+ack packet to the bandwidth monitoring unit 1 (1014) that waits for the response (2015), and releases a response wait state. Subsequently, the bandwidth monitoring unit 1 (1014) registers the record related to the above connection in the bandwidth DB 1015 (2016), transfers the received syn+ack packet to the host 1 (1001) (2017), and releases the response wait state.

Finally, the host 1 (1001) transmits the ack packet to the bandwidth monitoring unit 1 (1014) (2021). Subsequently, the bandwidth monitoring unit 1 (1014) transfers the received ack packet to the connection division coupling unit 1 (1016) (2022). Subsequently, the connection division coupling unit 1 (1016) transfers the received ack packet to the connection division coupling unit 2 (1036) that waits for the response with the use of the connection connected in Step 2003 (2023). Subsequently, the connection division coupling unit 2 (1036) registers the record related to the above connection in the connection division number DB 1037 (2024), transfers the received ack packet to the bandwidth monitoring unit 2 (1034) that waits for the response (2025), and releases a response wait state. Subsequently, the bandwidth monitoring unit 2 (1034) registers the record related to the above connection in the bandwidth DB 1035 (2026), transfers the received ack packet to the host 2 (1002) (2027), and releases the response wait state.

In the above processing flow, the WAN speed-up devices 1011 and 1031 inserted between the host 1 (1001) and the host 2 (1002) can start the proxy connection of the above connection, and register management information related to the above connection in the DB while conducting the communication processing of the 3-way handshake by proxy.

Figure 14:
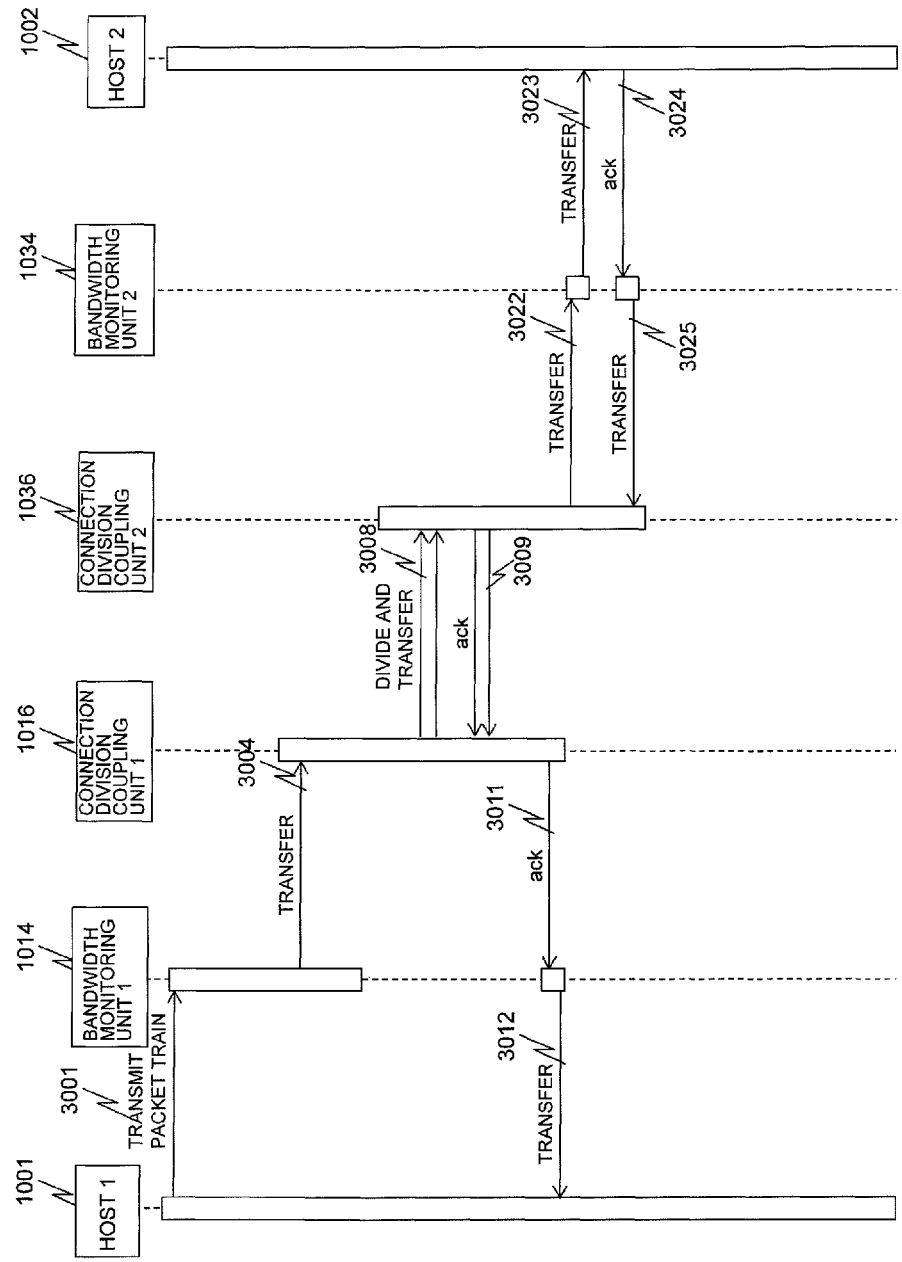
FIG. 14 is a diagram illustrating a communication sequence of a steady state according to the first embodiment.
Figure 15:
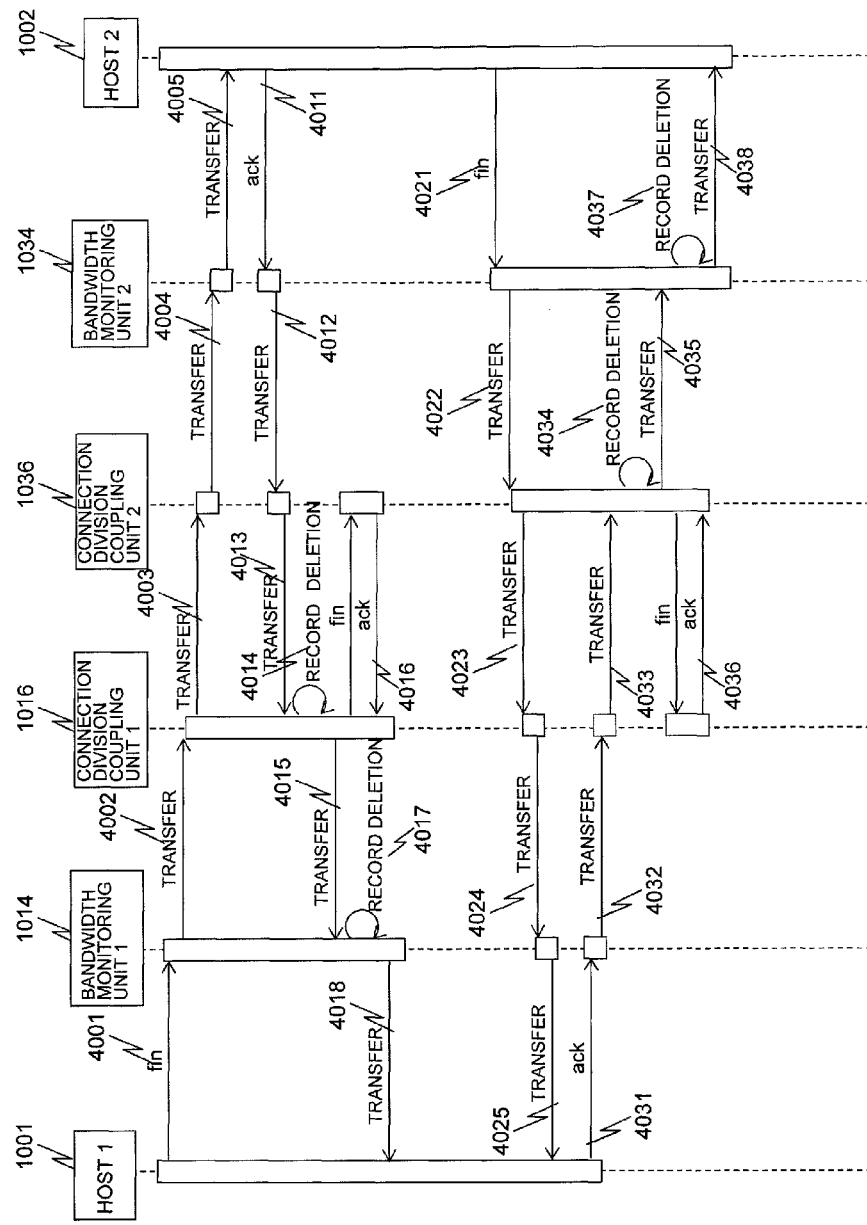
FIG. 15 is a diagram illustrating a connection end sequence according to the first embodiment.

FIG. 14 is a processing sequence example when communicating data between the host 1 (1001) and the host 2 (1002) with the use of the TCP connection that starts in FIG. 13. In this example, the host 1 (1001) transmits the data to the host 2 (1002). The same is applied to the reverse direction. At a time point of FIG. 13, the number of TCP connections between the connection division coupling units 1 (1016) and 2 (1036) is only one line. However, in this example, it is assumed that the number of TCP connections is two lines. A procedure related to an increase or decrease in the number of TCP connections between the connection division coupling units 1 (1016) and 2 (1036) is described above.

First, the host 1 (1001) transmits the packet train to the bandwidth monitoring unit 1 (1014) (3001). The bandwidth monitoring unit 1 (1014) receives the packet train as long as a buffer size at a maximum. The bandwidth monitoring unit 1 (1014) transfers the received packet train to the connection division coupling unit 1 (1016) according to the processing illustrated in FIGS. 5 and 6 (3004).

The connection division coupling unit 1 (1016) divides the received packet train according to the processing illustrated in FIGS. 7 and 8, transfers the divided packet train with the use of an appropriate connection (3008), and waits for reception of ack (3009). Subsequently, the connection division coupling unit 1 (1016) sorts the received ack in the sequence numerical order of the TCP, and transfers the ack to the bandwidth monitoring unit 1 (1014) (3011). Thereafter, the bandwidth monitoring unit 1 (1014) transfers ack to the host 1 (1001) (3012).

On the other hand, the connection division coupling unit 2 (1036) to which the packet train has been transferred with the use of the plurality of connections (3008) returns ack (3009). Thereafter, the connection division coupling unit 2 (1036) sorts the received packet trains in the sequence numerical order of the TCP, and transfers the packet trains to the bandwidth monitoring unit 2 (1034) (3022) according to the processing illustrated in FIGS. 7 and 9.

Subsequently, the bandwidth monitoring unit 2 (1034) transfers the received packet train to the host 2 (1002) according to the processing illustrated in FIG. 5 (3023). The host 2 (1002) returns ack to the bandwidth monitoring unit 2 (1034) according to a control of the TCP (3024), and the ack is transmitted to the connection division coupling unit 2 (1036) to terminate the processing.

In the above processing flow, the WAN speed-up devices 1011 and 1031 inserted between the host 1 (1001) and the host 2 (1002) can speed up the data communication between the host 1 (1001) and the host 2 (1002) with the use of a plurality of TCP connections.

FIG. 15 is a processing sequence example when the TCP connections are terminated between the host 1 (1001) and the host 2 (1002). In this example, the host 1 (1001) starts connection termination processing. The connection termination processing of the TCP is conducted in a procedure in which the fin packet is transmitted from the host 1 to the host 2, the host 2 then returns the ack packet responsive to the fin packet, the fin packet is further transmitted from the host 2 to the host 1 after data to be transmitted from the host 2 to the host 1 disappears, and the host 1 then returns the ack packet responsive to the fin packet.

First, the host 1 (1001) transfers the fin packet to the bandwidth monitoring unit 1 (1014) (4001). The respective modules propagate the fin packet (4002, 4003, 4004, 4005), and the fin packet arrives at the host 2 (1002). In a propagation process, the bandwidth monitoring unit 1 (1014) waits for the response from the connection division coupling unit 1 (1016) and the connection division coupling unit 1 (1016) waits for the response from the connection division coupling unit 2 (1036), respectively.

Subsequently, the host 2 (1002) transfers the ack packet to the bandwidth monitoring unit 2 (1034) (4011). The ack packet is propagated (4012, 4013) to the connection division coupling unit 1 (1016) as with the above case. The connection division coupling unit 1 (1016) deletes the record related to the appropriate connection from the connection division number DB 1017 (and 1037) (4014), and transfers the record to the bandwidth monitoring unit 1 (1014) (4015). Then, the connection division coupling unit 1 (1016) transfers fin-ack with respect to the respective divided connections to the connection division coupling unit 2 (1036) (4016), prepares for connection disconnection, and releases a response wait state. Similarly, the bandwidth monitoring unit 1 (1014) deletes the record related to the above connection from the bandwidth DB 1015 (4017), transfers the record to the host 1 (1001) (4018), and releases the response wait state.

Thereafter, the bandwidth monitoring unit 1 (1014) transfers the fin packet and the ack packet with the host 2 (1002) as an origin (4021 to 4038).

In the above processing flow, the WAN speed-up devices 1011 and 1031 inserted between the host 1 (1001) and the host 2 (1002) can terminate the divided connections between the connection division coupling units 1 (1016) and 2 (1036) by transfer of fin-ack in 4016 and 4036, while conducting the transfer of fin-ack by proxy.

Figure 16:
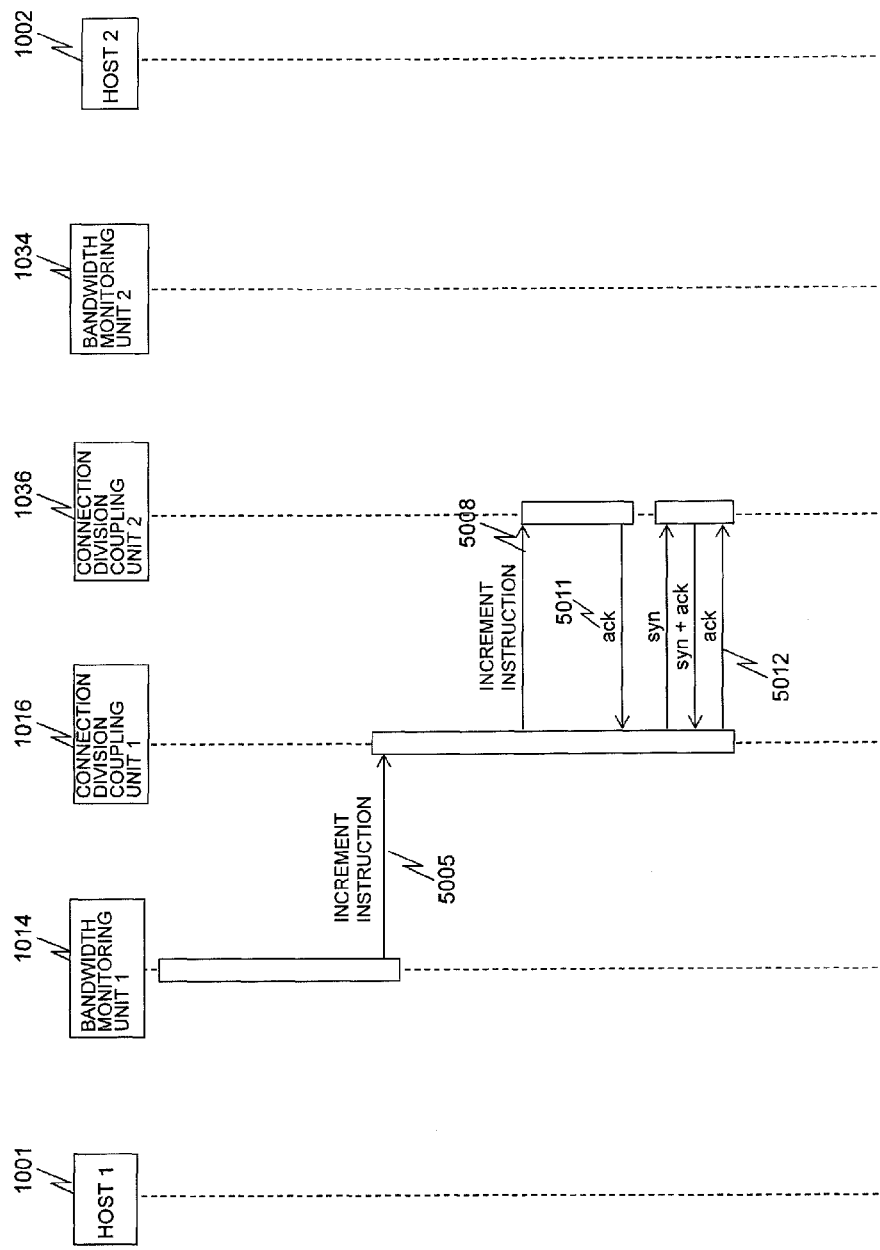
FIG. 16 is a diagram illustrating a reviewing sequence of the number of divided connections according to the first embodiment.

FIG. 16 is an example of a reviewing sequence of the number of divided connections between the connection division coupling units 1 (1016) and 2 (1036). This processing is conducted on all of the connections which are executed by the WAN speed-up devices 1 (1001) and 2 (1002) by proxy, for example, conducted on all of the connections in chronological order of registration into the bandwidth DB 1015. FIG. 16 illustrates a portion related on a certain connection among all of the connections.

First, the bandwidth monitoring unit 1 (1014) transmits an instruction 5005 for incrementing the number of divisions to the connection division coupling unit 1 (1016).

The connection division coupling unit 1 (1016) transmits the increment instruction with the contents of the updated record as an argument according to the processing illustrated in FIG. 11 (5008). In this example, the communication uses the control connection. Subsequently, the connection division coupling unit 2 (1036) returns ack to the connection division coupling unit 1 (1016) according to the processing illustrated in FIG. 11 (5011). Thereafter, the 3-way handshake is conducted between the connection division coupling units 1 (1016) and 2 (1036) to establish a new TCP connection (5012).

In updating the record (5007), if the length of the other port array is equal to or larger than 2, the connection division coupling unit 1 (1016) does not conduct the update of the record, and transmits only an increment instruction 5008 to the connection division coupling unit 2 (1036). Thereafter, the connection division coupling unit 2 (1036) searches its own free port, and adds the free port to the subject port array to conduct the record update processing. Thereafter, the connection division coupling unit 2 (1036) returns the increment instruction to the connection division coupling unit (1016). That is, the increment processing is conducted reversely from FIG. 16.

In the above processing flow, the number of divided connections between the connection division coupling units 1 (1016) and 2 (1036) can be reviewed to increment the number of divided connections. Also, when a last connection start processing 5012 can be changed to the connection termination processing to decrement the number of divided connections. The configuration of FIG. 1 is taken by using the WAN speed-up device installing the above processing steps, thereby being capable of speeding up the communication between the host 1 (1001) and the host 2 (1002).

Second Embodiment

In this example, a description will be given of an example of the WAN speed-up device having a mechanism that improves the determination of whether the number of divisions needs to be changed, or not, and avoids an unnecessary increase in the number of connections between the WAN speed-up devices 1011 and 1031.

FIG. 17 is an example of the schema and record in the bandwidth DB 1015 (and 1035) of the WAN speed-up device 1011 (and 1031) according to a second embodiment. A schema 16001 of the bandwidth DB is designed to add an "output rate array per connection" column 16002 to the schema of the bandwidth DB in the first embodiment. It is assumed that an $n^{th}$ value of the array of the column 16002 is a maximum value of the output rate per connection when the connection is divided by n, and the present number of divisions is an array length. In the example illustrated in the figure, when a leftmost array is 1 in the number of divisions, the number of divisions become 2, ... n in order. For example, if the number of divisions is further increased, the number of arrays is increased, and if the number of divisions is decreased, the number of arrays is also decreased. With this configuration, a rightmost array in the figure becomes a value in the present number of divisions. In the WAN speed-up device 1011 (and 1031) of FIG. 1, the configurations denoted by identical reference numerals or symbols illustrated in FIG. 1 already described, and the portions having the same functions will be omitted from the description.

Hereinafter, a method for updating the column 16002 will be described. When the output rate is updated in Step 5003 (and 11004), a value obtained by dividing the present output rate by the array length (that is, the present number of divisions) is compared with an end (that is, a maximum value in the present number of divisions) of the column 16002. If the value obtained by dividing the present output rate by the array length is larger, the end of the column 16002 is updated by the value obtained by dividing the present output rate by the array length. That is, the maximum value of the output rate per connection is stored. Also, if the increment instruction is output in Step 5005 (and 11006), the array length of the column 16002 is incremented by one, and if the decrement instruction is output, the array length of the column 16002 is decremented by one.

Hereinafter, a description will be given of a method for determining whether the number of divisions needs to be changed, or not, using the column 16002. In determination in Step 5004 (and 11005), a value of the end (that is, an output rate maximum value per present connection) of the array is compared with a value next to the end (that is, an output rate maximum value per connection when the number of divisions is smaller by one) with reference to the column 16002. If the value of the end of the array is smaller than the value next to the end by, for example, 20% or larger (or if their ratio is smaller than a threshold value), it is determined that the division is unnecessary (the division is not allowed). For example, in this case, it is assumed that even if the number of divisions is increased, the effective bandwidth is not largely improved. Aside from 20%, a predetermined appropriate threshold value (third threshold value) may be used.

The configuration of FIG. 1 is taken by using the WAN speed-up device installing the above processing steps, thereby being capable of speeding up the communication between the host 1 (1001) and the host 2 (1002) while avoiding an unnecessary increase in the number of connections between the WAN speed-up devices 1011 and 1031.

Third Embodiment

In this embodiment, a description will be given of an example of a WAN speed-up device that has a mechanism further improves the division number necessity determination of the second embodiment (or the first embodiment), and that avoids an unnecessary increase in the number of connections between the WAN speed-up devices 1011 and 1031, and improves a speed of the parent connection when the above fourth problem occurs even if the bandwidth is short.

FIG. 21 illustrates two examples in which a speed difference occurs between the child connections. In an example 1 (21041), a parent connection between a PC 21001 and a server 21002 is divided into five child connections for speed-up by proxy devices 21011 and 21012 each having a TCP division function. However, four 21031 of the child connections pass through the same path, but only one child connection 21032 passes through a different path. In this situation, for example, when the path through which the child connection 21032 passes is longer in distance on the network and larger in communication delay, the child connection 21032 becomes relatively lower in speed than the other child connections 21031.

On the other hand, in an example 2 (21042), a connection between a PC 21101 and a server 21102 is divided into five child connections by proxy devices 21111 and 21112 each having a TCP division function, and further speeded up with the use of TCP high-speed devices 21121 and 21122. However, hardware resources of the TCP speed-up devices 21121 and 21122 are limited, and therefore the number of speed-up enable connections generally has an upper limit. When the number of connections is provided beyond the upper limit of the number of connections, those connections are not speeded-up are passed through. In the example 2 (21042), four 21131 of five child connections are speeded up, but one child connection 21132 is not speeded up. Also, in this case, the child connection 21132 is relatively lower in speed than the four child connections 21131. The present invention is not limited to those examples.

The configuration of the network system and the configuration of the WAN speed-up devices 1011, 1031 are roughly similar to the configuration (FIG. 1, etc.) of the above-mentioned first and second embodiments. Hereinafter, parts different from those of the above embodiments will be mainly described.

In this embodiment, connection division coupling units 1016 and 1036 each further include a function of measuring and recording transmit/receive bandwidths for each of the child connections. Specifically, the connection division coupling units 1016 and 1036 each tally ACK messages returned for each of the child connections, and measure the transmit bandwidth. More specifically, an ACK sequence number first returned is subtracted from an ACK sequence number finally returned within a certain unit time, and then divided by a length of a unit time, to thereby obtain a transmit bandwidth. Also, the connection division coupling units 1016 and 1036 each tally the ACK messages returned for each of the child connections, and measure the receive bandwidth. More specifically, the ACK sequence number first returned is subtracted from the ACK sequence number finally returned within the certain unit time, and then divided by the length of the unit time, to thereby obtain the receive bandwidth. The transmit/receive bandwidths for each child connection obtained in this example are stored in the connection division number DB.

Figure 22:
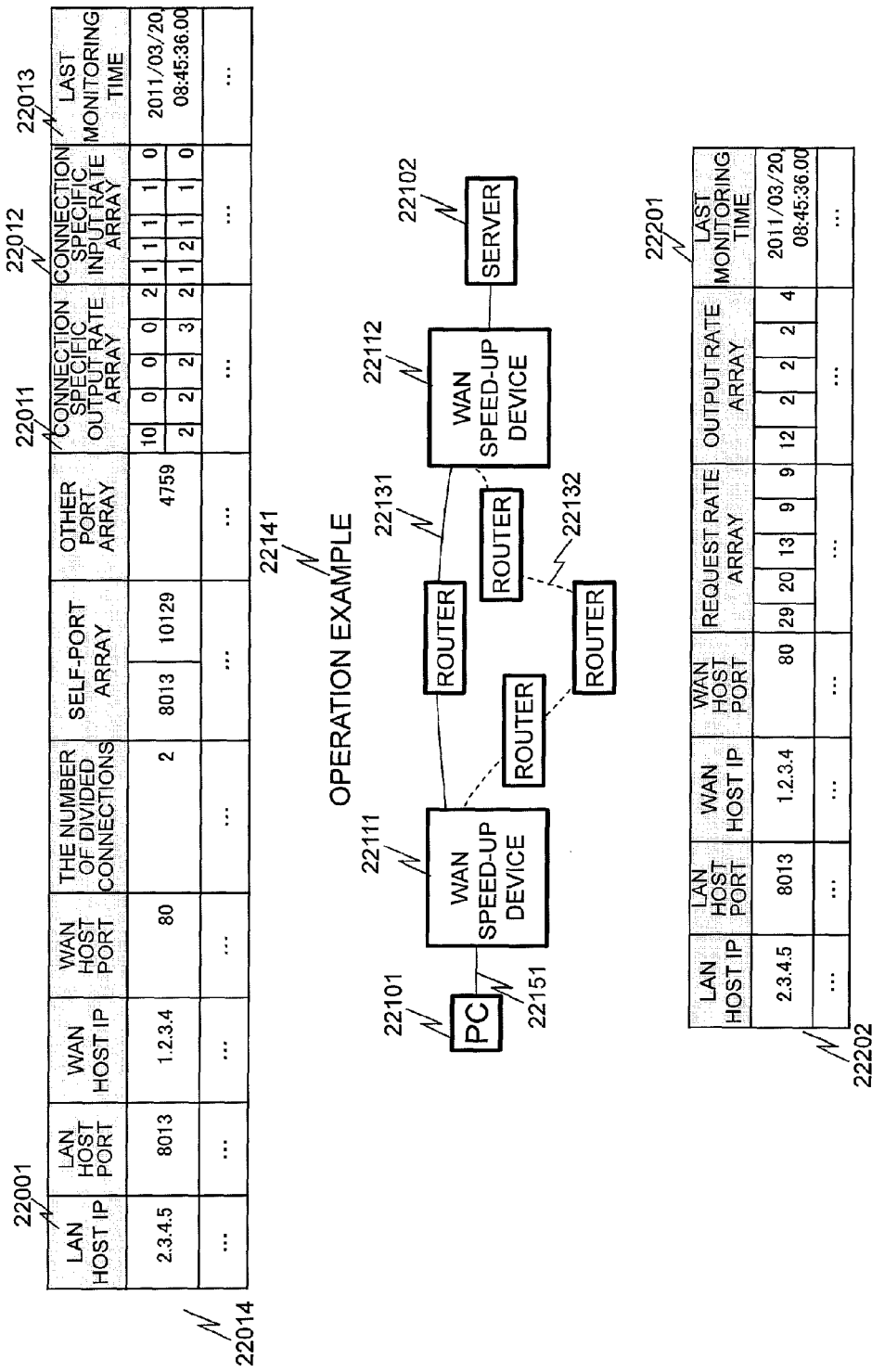
FIG. 22 is an illustrative view (1) of a division necessity determination using a connection division number DB according to a third embodiment.

A table 22011 in FIG. 22 illustrates a schema and record example of the connection division number DB used in this embodiment. As compared with the table 15001 of the connection division number DB 1017 (1037) used in the first and second embodiments, the connection division number DB used in this embodiment is added with a column 22011 of connection specific output rate array, a column 22012 of connection specific input rate array, and a last monitoring time column 22013.

Figure 23:
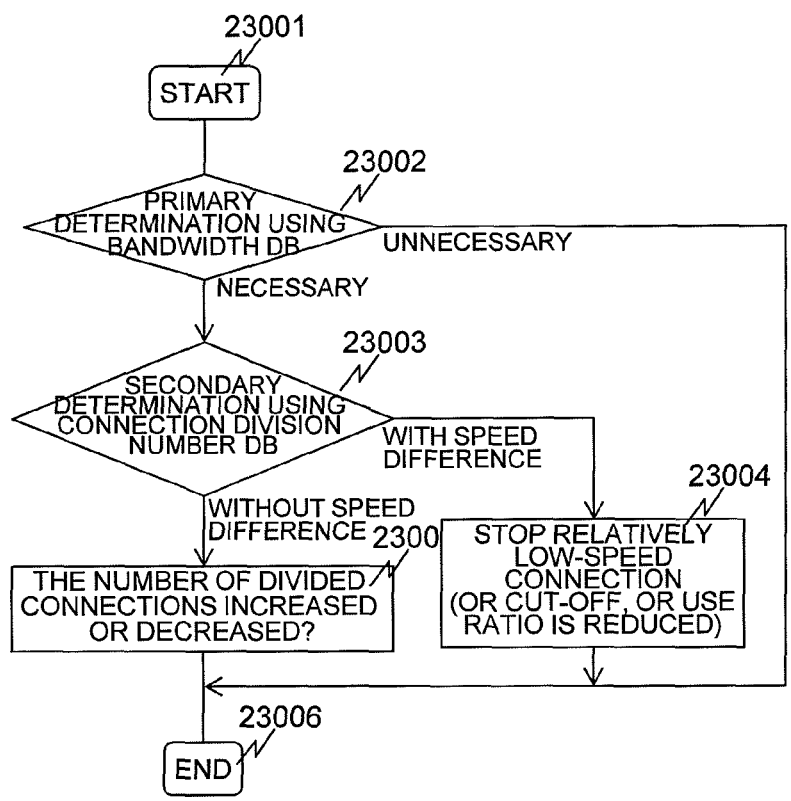
FIG. 23 is an illustrative view (2) of the division necessity determination using the connection division number DB according to the third embodiment.

The division necessity determination using the connection division number DB according to this embodiment will be described with reference to FIGS. 22 and 23. For example, this corresponds to processing 17003 of division number reference/change in FIG. 4. Hereinafter, values are clearly specified as an example for description, but the other values may be used.

In this embodiment, the division necessity determination is conducted with the use of a bandwidth monitoring unit 1014 (and 1034), and a connection division coupling unit 1016 (and 1036).

First, the connection division number DB according to this embodiment will be described. It is assumed that a table 22001 is a connection division number DB provided in the WAN speed-up device 22111 in the overall diagram 22141 of an operation example. A row 22014 in the table 22001 represents a parent connection 22151 of the overall diagram 22141 of the operation example. In this example, a PC (corresponding to a host 1) 22101 has an IP address of 2.3.4.5, and a server (corresponding to a host 2) 22102 has an IP address of 1.2.3.4. Also, a plurality (for example, two) of child connections are provided between the WAN speed-up devices 22111 and 22112. The child connection 22131 is extended between a port 8013 of the WAN speed-up device 22111 and a port 4759 of the WAN speed-up device 22112. Also, the child connection 22132 is extended between a port 10129 of the WAN speed-up device 22111 and the port 4759 of the WAN speed-up device 22112. In this example, the column 22011 of the connection specific output rate array and the column 22012 of the connection specific input rate array are repetitive column.

The column 22011 of the connection specific output rate array stores output rates every given time for each of the connections therein. The column 22012 of the connection specific input rate array stores the input rate every given time for each of the connections. In this situation, for example, the connection specific output rate array of the child connection 22131 (that is, child connection having its port No. 8013) is [10, 0, 0, 0, 2], and the connection specific output rate array of the child connection 22132 (that is, child connection having its port No. 10129) is [2, 2, 3, 2, 2]. Likewise, the connection specific input rate array of the child connection 22131 (that is, child connection having its port No. 8013) is [1, 1, 1, 1, 0], and the connection specific output rate array of the child connection 22132 (that is, child connection having its port No. 10129) is [1, 2, 1, 1, 0]. Also, the last monitoring time column 22013 holds the last monitoring times of the connection specific output rate array 22011 and the connection specific input rate array 22012. In this embodiment, an acquisition period of a moving average is set to 5 seconds, but an acquisition period other than 5 seconds may be used as a value of the system definition or the user definition. Also, an obtained moving average may be further stored in the connection division number DB. The connection specific output rate array, the connection specific input rate array, and the method for updating the last monitoring time in Table 220011 are identical with the request rate array or the output rate array of the bandwidth DB, and the method for updating the last monitoring time which are described with reference to FIG. 2 in the first embodiment.

Subsequently, the bandwidth DB of this embodiment will be described. A table 22201 illustrated in FIG. 22 is a bandwidth DB of this embodiment. In this example, a row 22202 of the table 22201 is a row representing the parent connection 22151. The configuration of the bandwidth DB is identical with that of the above-mentioned embodiment.

Subsequently, a flow of the division necessity determination will be described with reference to FIG. 23. FIG. 23 is a flowchart illustrating an outline of the division necessity determination according to this embodiment.

Figure 26:
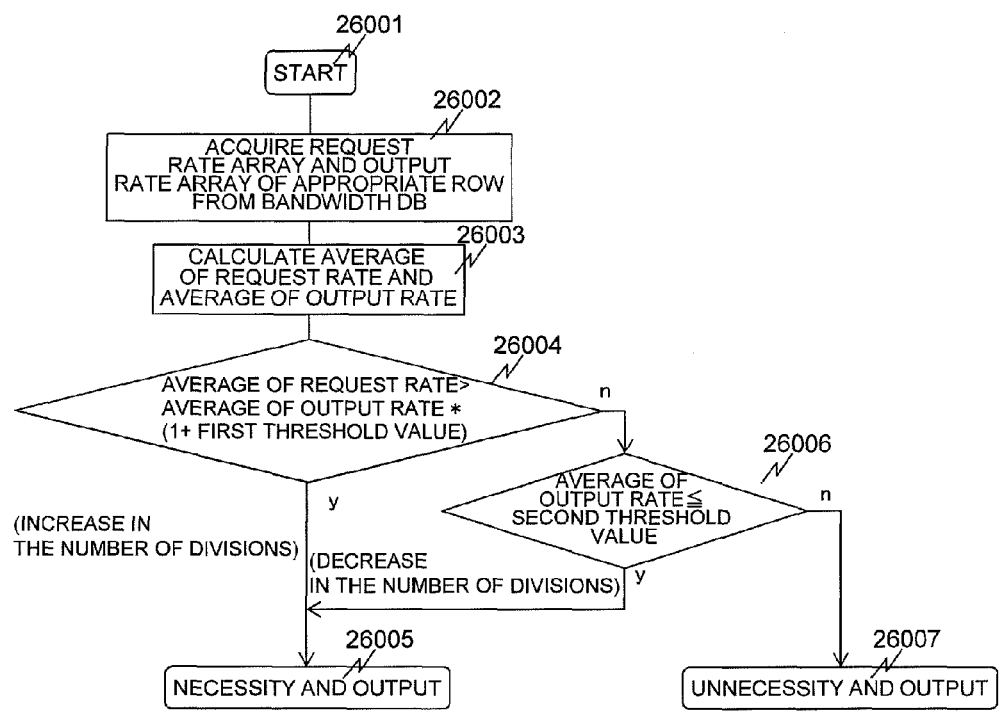
FIG. 26 is a flowchart of primary determination of division necessity.

In this embodiment, after the division necessity determination starts 23001, the bandwidth monitoring unit first conducts a primary determination of the division necessity with the use of the bandwidth DB 22201 26001. FIG. 26 illustrates a specific example of the primary determination. First, the bandwidth monitoring unit acquires a request rate array and an output rate array from a column 22202 corresponding to a target connection in the bandwidth DB 22201 26002, and calculates an average of the request rates and an average of the output rates 26003. In this example, it is found that the moving average of the request rate is 12.4 packets/sec whereas the moving average of the output rate is 4.4 packets/sec. The appropriate row can be uniquely identified with the use of four sets of "LAN host IP column, LAN host port column, WAN host IP column, and WAN host port column" of the target connection. Subsequently, the bandwidth monitoring unit determines whether the average of the request rate is larger than the output rate by a given threshold value or more, or not, 26004, and if larger, the number of divisions needs to be increased. Therefore, "division necessity" is output (determined) 26005. On the other hand, if smaller in the determination 26004, the bandwidth monitoring unit subsequently determines whether the average of the output rate is larger than a second threshold value, or not, 26006, and if larger, the number of divisions needs to be decreased. Therefore, "division necessity" is output (determined) 26005. On the other hand, if smaller in the determination 26006, the bandwidth monitoring unit outputs "unnecessary" 26007. As an example of the threshold values, if the request rate is larger than the output rate by 20% (first threshold value) or more, the number of divisions needs to be increased. If the output rate is 0 packets/sec (second threshold value), the number of divisions needs to be decreased. In none of those cases, "division unnecessity" is determined. In this embodiment, it is assumed that the threshold value is 20% and 0 packets/sec. However, a threshold value other than the above values may be used as a value of the system definition or the user definition. In this embodiment, it is determined that the number of divisions needs to be increased as the result of the primary determination. In this example, if the "division unnecessity" is determined, the division necessity determination is completed 23006.

Figure 27:
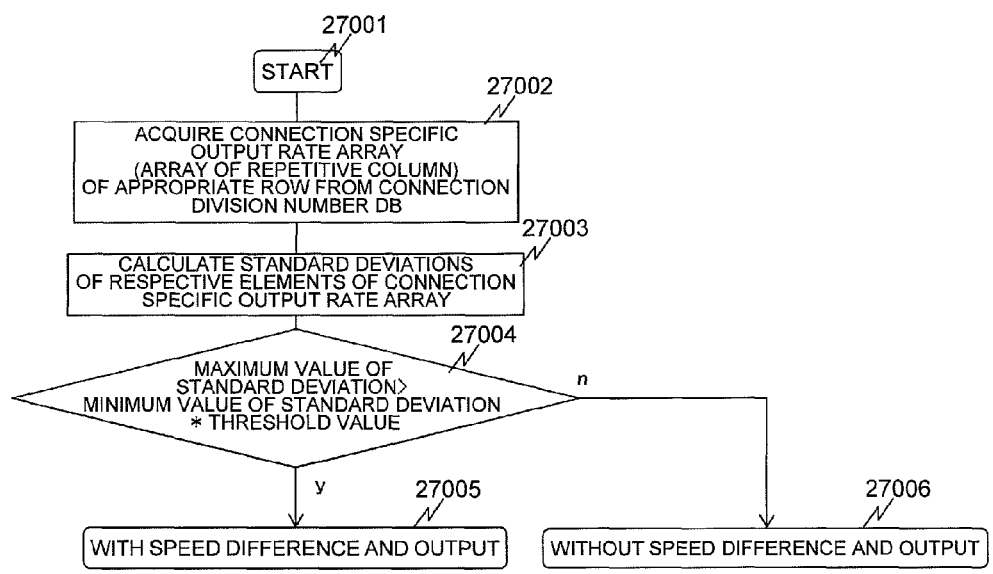
FIG. 27 is a flowchart of secondary determination of the division necessity.

Subsequently, a secondary determination 23003 of the division necessity is conducted with the use of the connection division number DB 22001 27001. FIG. 27 illustrates a specific example of the secondary determination. In the secondary determination, it is determined whether a speed difference is present in the respective child connections, or not. In this embodiment, the secondary determination is conducted on the basis of the average of the connection specific input rate array or the connection specific input rate array, and an index indicative of a variation such as the standard deviation. The connection division coupling unit acquires the connection specific output rate array from the row 22014 corresponding to the target connection in the connection division number DB 22001. The connection specific output rate array is an array (vertical direction) of the repetitive columns (horizontal direction in FIG. 22). In the case of the row 22014, an array [10, 0, 0, 0, 2] and an array [2, 2, 2, 3, 2] are repeated. Subsequently, the connection division coupling unit calculates the standard deviation of the respective elements in the connection specific output rate array for each of the child connections 27003. In this example, the standard deviation of the connection specific output rate array of the child connection 22131 (that is, child connection having its port number 8013) is the standard deviation of [10, 0, 0, 0, 2], that is, 3.88. On the other hand, it is found that the standard deviation of the connection specific output rate array of the child connection 22132 (that is, child connection having its port number 10129) is the standard deviation of [2, 2, 2, 3, 2], that is, 0.40. Subsequently, the connection division coupling unit determines whether a ratio of a maximum value of the standard deviation and a minimum value of the standard deviation falls within a predetermined threshold value, or not, in the respective connections 27004. As a result of the determination, if the ratio does not fall within the threshold value, the connection division coupling unit outputs (determines) "with speed difference" 27005. If the ratio falls within the threshold value, the connection division coupling unit outputs (determines) "without speed difference" 27006. A ratio of appropriate two standard deviations other than the ratio of the maximum value of the standard deviation and the minimum value of the standard deviation may be used for comparison to the threshold value.

In this example, it is found that the standard deviation of the child connections 22131 is 9.7 times as large as the standard deviation of the child connections 22132, and the child connection 22132 does not conduct the transmission at a stable rate. This is because, in this embodiment, data is allocated to the child connections 22131 and the child connection 22132 in the round-robin fashion for transfer. Specifically, if a given amount of data is equivalently allocated to both of the connections at certain timing, the relatively low-speed child connection 22132 (low-speed connection whose speed difference from the other connection is a given speed, or higher) can transfer the data only little by little. For that reason, it takes more time for transfer than the relatively high-speed child connections 22131 (high-speed connection whose speed difference from the other connection is a given speed, or higher). In this situation, in this embodiment, because data allocation is conducted in the round-robin fashion, data cannot be allocated to the relatively high-speed child connections 22131 either until the transfer of the relatively low-speed child connection 22132 is terminated. For that reason, the relatively high-speed child connections 22131 transfer the data in a burst fashion, and the standard deviation becomes large. In this embodiment, if the standard deviation is different by five times or more in the secondary determination 23003 as an example, it is determined that a speed difference is present between the child connections, and it is determined that the use of the connection having the relatively small standard deviation stops 23004, and the processing is completed 23006. On the other hand, if the standard deviation is not different by five times or more, it is determined that no speed difference is present between the child connections, and the number of divisions is increased or decreased as in the embodiment 23005, and the processing is completed 23006. In this embodiment, as described above, the threshold value of the standard deviation is set to 5. However, a threshold value other than this value may be used as the value of the system definition or the user definition. Also, in this embodiment, evaluation is conducted with the use of the standard deviation. Alternatively, dispersion may be used, or an index indicative of the other variation may be used. A variation such that the threshold value (5 in this embodiment) is moved up and down according to an average where the standard deviation and the average are combined together is also conceivable.

When it is determined that the use of the relatively low-speed child connection stops in the procedure 23004, if the low-speed child connection is cut off, the use resources of the WAN speed-up devices 22111 and 22112 can be reduced. For that reason, in this embodiment, the low-speed child connection is cut off. However, as described above, the cut-off of the low-speed child connection is not essential, and even if this connection remains, the use of the connection may stop, and the same effect of the speed-up is obtained. Also, the number of child connections whose use stops may not be one. At the same time, the use of the plurality of child connections can stop. That is, the determination in the procedure 23004 is, in other words, a determination that a communication is conducted with the use of only the relatively high-speed child connections if a communication speed of the parent session does not arrive at the target speed. As a result, the number of connections used for communication is decreased, but the speed-up can be achieved as compared with a case in which the relative low-speed connection is used.

Also, it is determined that the use of the relatively low-speed child connection stops in the procedure 23004. Alternatively, such a variation that the use of the low-speed child connection does not completely stop, but a use frequency is reduced, that is, a smaller amount of data than that of the other child connections flows in the low-speed child connection is conceivable. In this case, for example, an average of the connection specific output rate arrays of the low-speed child connection at a certain time is set as an approximate value of the moving average of the low-speed child connection, and as a data allocation amount to the low-speed child connection in the connection division/coupling programs 1014 and 1034. The data is allocated to the other child connections (that is, the relatively high-speed child connections) in the round-robin fashion as in the related art. As a technique for reducing the use frequency, another allocation technique may be used.

In this embodiment, the above division necessity determinations are conducted with the use of the bandwidth monitoring unit 1014 (and 1034) and the connection division coupling unit 1016 (and 1036). Among those determinations, the primary determination 23002 is processed by the bandwidth adjustment processing illustrated in FIG. 10 by the bandwidth monitoring unit 1014 (and 1034) as in the first embodiment. The determination 11005 within the bandwidth adjustment processing corresponds to the primary determination. One secondary determination 23003 is conducted with the use of the improved bandwidth adjustment processing A in FIG. 24, and the improved bandwidth adjustment processing B in FIG. 25 by the connection division unit 1016 (and 1036).

Figure 24:
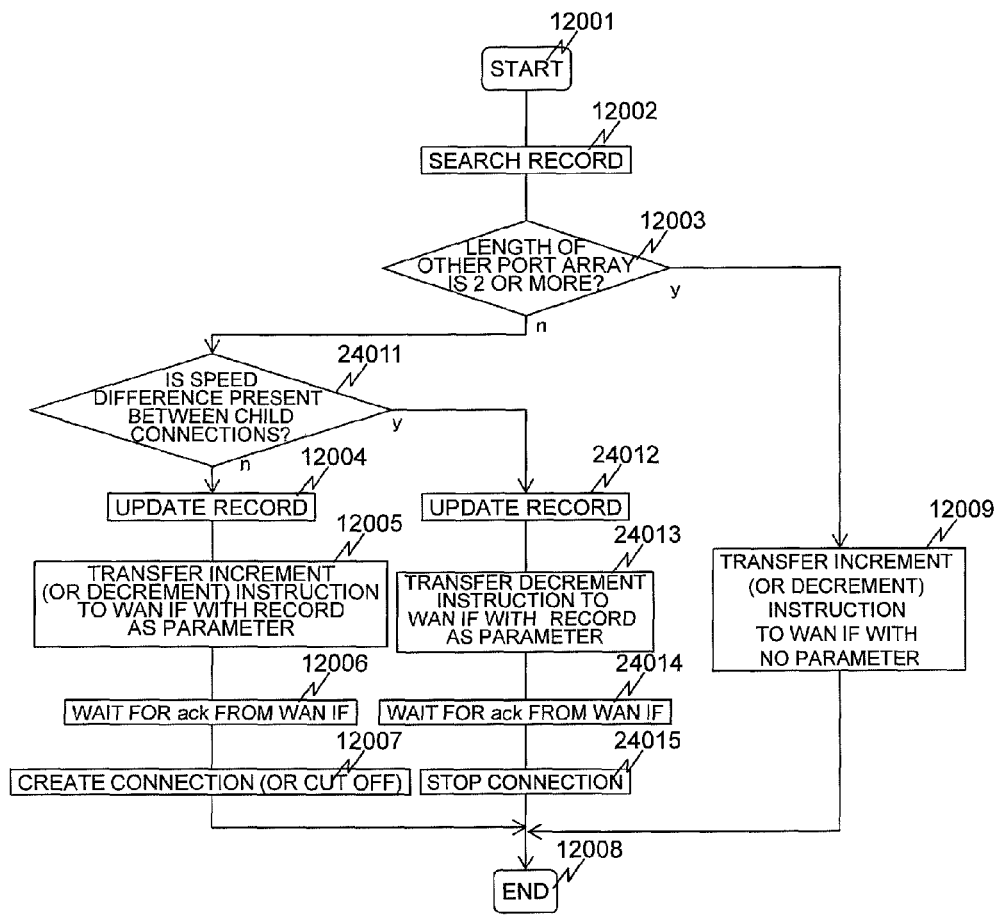
FIG. 24 is a flowchart of a bandwidth adjusting processing A according to the third embodiment.

The improved bandwidth adjustment processing A illustrated in FIG. 24 conducts the secondary determination 23003 subsequently to the processing 12003 of the bandwidth adjustment processing A in the first embodiment 24011. As a result of conducting the secondary determination 24011, if it is determined that a speed difference is present between the child connections, as described in the above-mentioned determination 23003, the relatively low-speed child session is deleted from the record found in the procedure 12002, and the record is updated 24012. Thereafter, a decrement instruction is transmitted to the connection division coupling unit 2 (1036) of the counter WAN speed-up device through the WAN interface 1013, with the content of the record updated in the record update 24012 as a parameter 24013. In the communication of this case, the control connection is used. The connection division coupling unit 1 (1016) waits for ack from the connection division coupling unit 2 (1036) through the WAN interface 1013 24014. Thereafter, the connection division coupling unit 1 (1016) stops the use of the relatively low-speed TCP connection with respect to the connection division coupling unit 2 (1036) 24015. In this situation, as described above, for the purpose of reducing the use resources of the WAN speed-up devices 22111 and 22112, the low-speed child connection can be cut off. However, the cut-off of the low-speed child connection is not essential, and even if the low-speed child connection remains, the same effects are obtained if the use of the low-speed child connection stops. The other processing in FIG. 24 is identical with the processing illustrated in FIG. 11. The same processing is denoted by identical symbols, and its description will be omitted.

Figure 25:
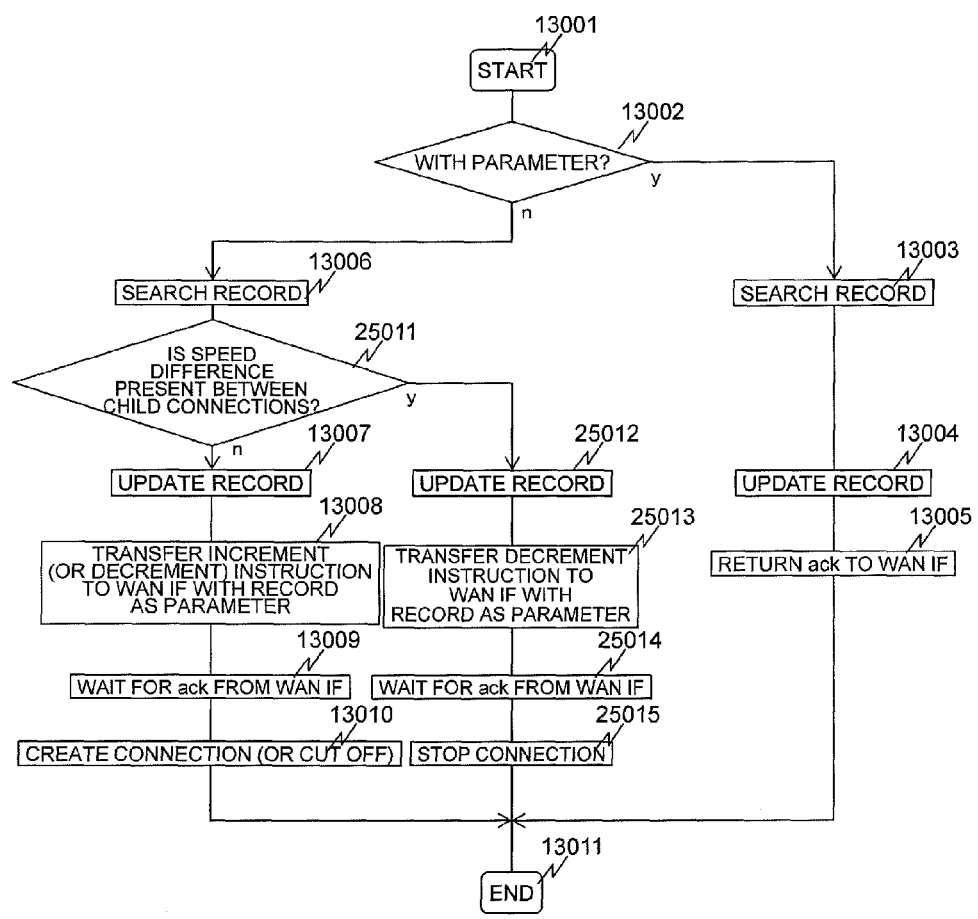
FIG. 25 is a flowchart of a bandwidth adjusting processing B according to the third embodiment.

Subsequently, the improved bandwidth adjustment processing B illustrated in FIG. 25 conducts the secondary determination 23003 subsequently to the processing 13006 of the bandwidth adjustment processing B in the first embodiment 25011. As a result of conducting the secondary determination 25011, if it is determined that a speed difference is present between the child connections, as described in the determination 23003, the relatively low-speed child session is deleted from the record found in the procedure 12002, and the record is updated 25012. Thereafter, a decrement instruction is transmitted to the connection division coupling unit 1 (1016) through the WAN interface 1013, with the content of the record updated in the record update 25012 as a parameter 25013. In the communication of this case, the control connection is used. The connection division coupling unit 2 (1036) waits for ack from the connection division coupling unit 1 (1016) through the WAN interface 1013 25014. Thereafter, the connection division coupling unit 2 (1036) stops the use of the relatively low-speed TCP connection with respect to the connection division coupling unit 1 (1016) 25015. In this situation, as described above, for the purpose of reducing the use resources of the WAN speed-up devices 22111 and 22112, the low-speed child connection can be cut off. However, the cut-off of the low-speed child connection is not essential, and even if the low-speed child connection remains, the same effects are obtained if the use of the low-speed child connection stops.

With the use of the above-mentioned improved processing procedure, there can be implemented the WAN speed-up device having a mechanism that avoids an unnecessary increase in the number of connections between the WAN speed-up devices 1011 and 1031, and improves a speed of the parent connection when the above fourth problem occurs even if the bandwidth is short.

For example, even if the average of the request rate is larger than the average of the output rate by a given value or larger, and it is determined that the number of divisions is increased in the primary determination, if the speed difference is absent (or small) between the child connections, the number of divided connections is increased for speed-up. If the speed difference is present (or larger) between the child connections, the number of divided connections is reduced without the use of the relatively low-speed connection for speed-up, reversely. Another connection may be used instead of the low-speed connection, and the number of divided connections may not always been decreased.

Fourth Embodiment

In this embodiment, the bandwidth monitoring programs 1014 and 1034, the bandwidth DBs 1015 and 1035, the connection division coupling programs 1016 and 1036, and the connection division number DBs 1017 and 1037 which are required for the operation of the WAN speed-up devices 1011 and 1031 according to the first embodiment, the second embodiment, or the third embodiment are read in the secondary storages 1019 and 1039 before the system operates, for example, when the system is installed or starts, to thereby enable the operation using the general-purpose server device.

Figure 18:
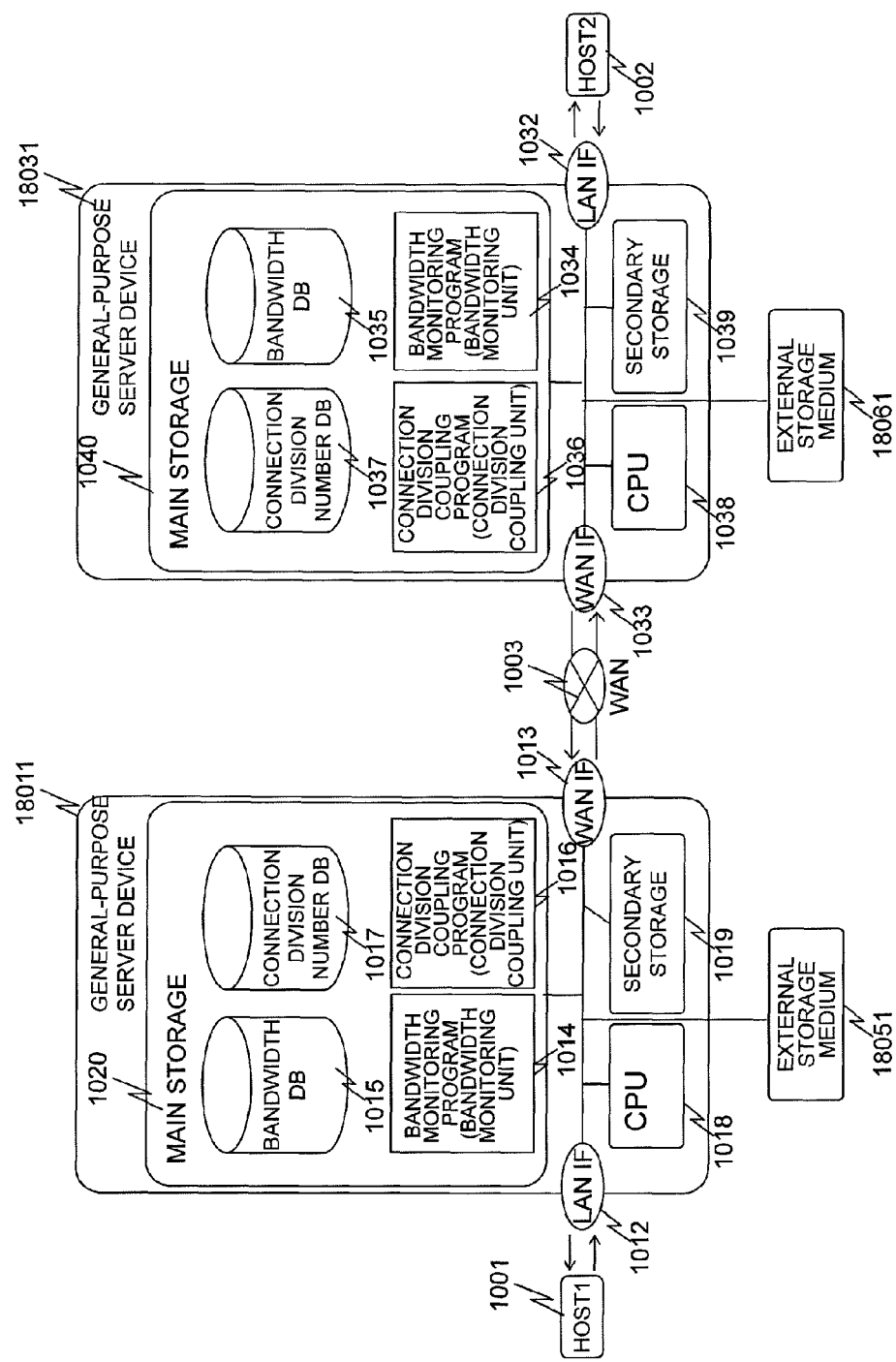
FIG. 18 is a diagram illustrating an overall configuration according to a third embodiment.

FIG. 18 is an exemplary configuration diagram of the communication system using the general-purpose server device according to a fourth embodiment. In the fourth embodiment, a procedure of reading the bandwidth monitoring programs 1014 (and 1034), the bandwidth DB 1015 (and 1035), the connection division coupling programs 1016 (and 1036), and the connection division number DB 1017 (and 1037) in the secondary storage 1019 (and 1039) of a general-purpose server device 18011 (and 18031) with the use of an external storage medium 18051 (and 18061) such as a CD-ROM, is conducted after the general-purpose server device 18011 (and 18031) has been installed. In the fourth embodiment, the external storage medium is used to read the respective programs and DBs in the general-purpose server device 18011 (and 18031). Also, the same effects can be obtained even if the respective programs and DBs are downloaded from another server device or a file server on the network 1033.

The configuration of FIG. 18 is taken by executing the above processing steps and using the general-purpose server device, thereby being capable of speeding up the communication between the host 1 (1001) and the host 2 (1002).

Fifth Embodiment

In this embodiment, the function of the WAN speed-up device 1011 and the function of the host 1 (1001), and/or the function of the WAN speed-up device 1031 and the function of the host 2 (1002) according to the first embodiment, the second embodiment, the third embodiment, or the fourth embodiment operate within the same general-purpose server device.

Figure 19:
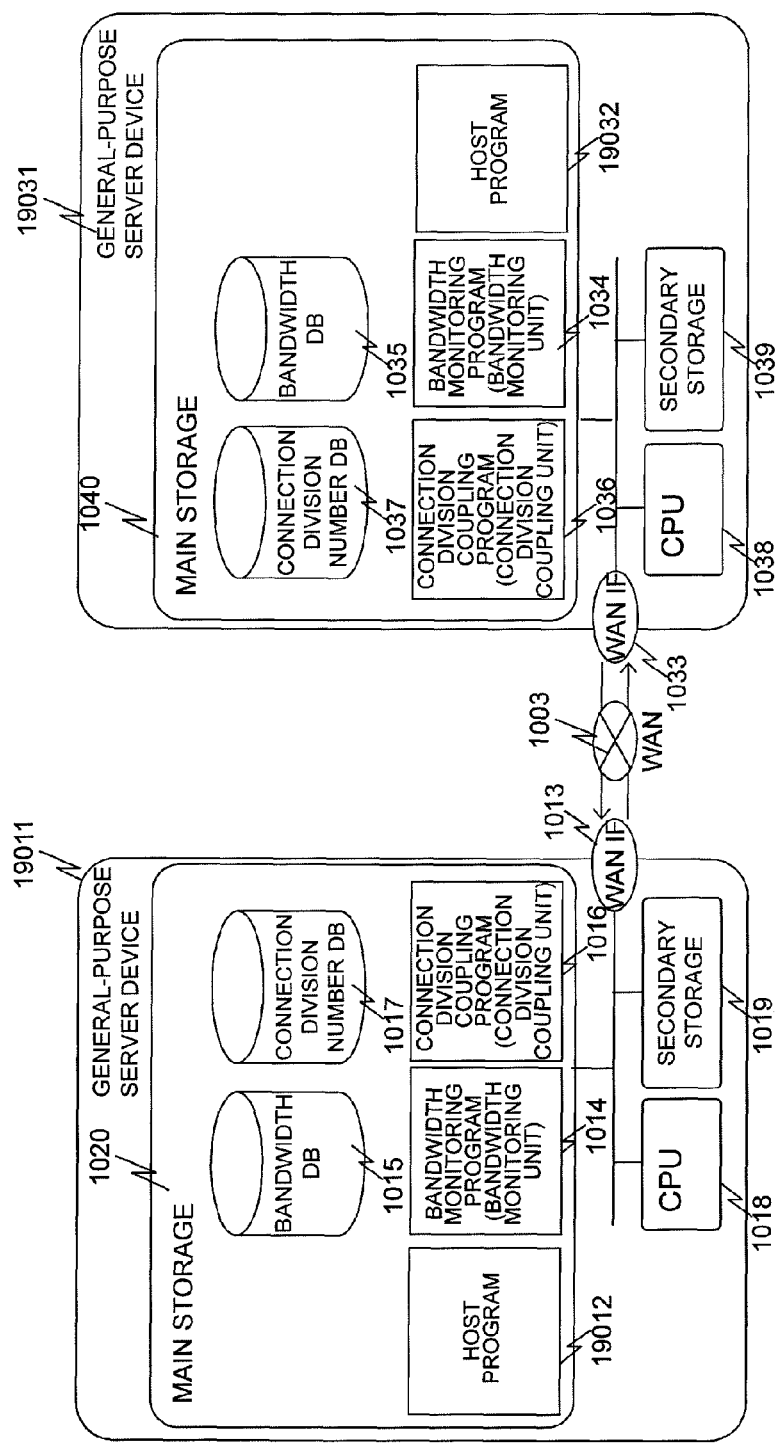
FIG. 19 is a diagram illustrating an overall configuration according to a fourth embodiment.
Figure 20:
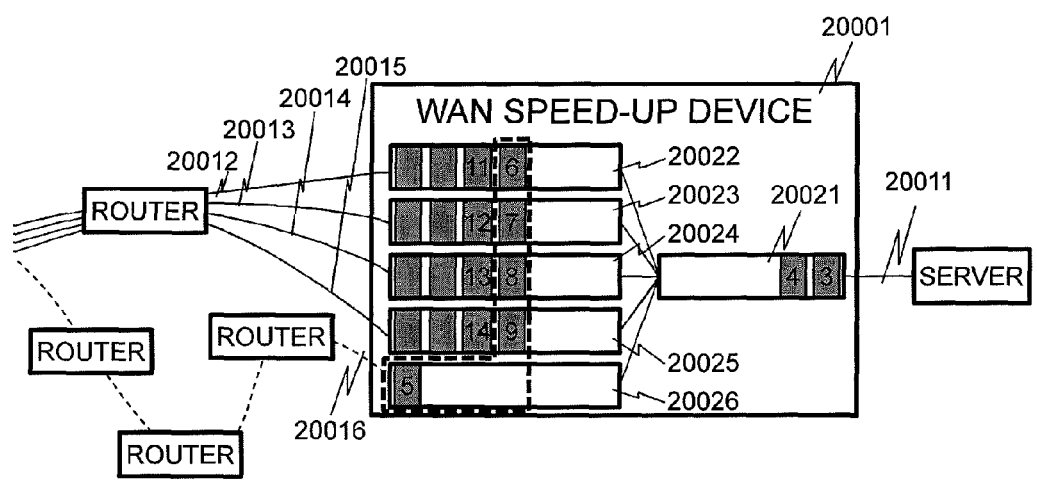
FIG. 20 illustrates an example of the proxy device employing a TCP multiplexing method in a state where a fourth problem arises.

FIG. 19 is an exemplary configuration diagram of a communication system using the general-purpose server device in which the function of the WAN speed-up and the function of the host operate within the same device according to a fifth embodiment. In the fifth embodiment, a host program 19012 (and 19032) necessary for the operation of the host 1 (1001) (and the host 2 (1002)) according to the first embodiment, the bandwidth monitoring program 1014 (and 1034) and the connection division coupling program 1016 (and 1036) necessary for the operation of the WAN speed-up device operate by a general-purpose server device 19011 (and 19031). Also, the main storage 1020 (and 1040) includes the bandwidth DB 1015 (and 1035) and the connection division number DB 1017 (and 1037) necessary for the operation of the bandwidth monitoring program 1014 (and 1034) and the connection division coupling program 1016 (and 1036). Also, in the fourth embodiment, the host program 19012 (and 19032) and the bandwidth monitoring program 1014 (and 1034) communicate with each other by using a loop back device available by a large number of general-purpose server devices instead of the LAN IF 1012 (and 1032) of the first embodiment. In the fifth embodiment, the respective programs and DBs are saved in the secondary storage 1019 (and 1039), and read in the main storage 1020 (and 1040) after the general-purpose server device 19011 (and 19031) starts. However, the same effects can be obtained even if the respective programs and DB are read from the external storage medium as in the fourth embodiment, or downloaded from another server device or a file server on the network.

The configuration of FIG. 19 is taken by executing the above processing steps and using the general-purpose server device in which the WAN speed-up device and the host operate within the same device, thereby being capable of speeding up the communication between the host program 19012 and the host program 19032.

CONFIGURATION EXAMPLE

Configuration Example A-1

In a configuration example A-1, the speeds of the child sessions are compared with each other, and a communication is conducted by the selected child session on the basis of the comparison results and the speed target of the parent session.

For example, there is provided a network device that relays a TCP communication through a first network and a second network between hosts, including:

a first storage area that holds a request rate based on the amount of data input from the first network, and an output rate indicative of an effective bandwidth for transferring data to the second network, for each of TCP connections between the hosts;

a connection division coupling unit that divides the data from the first network into a plurality of connections established with respect to a counter network device of the second network, and transfers the data, and couples the data through the plurality of connections from the second network, and transfers the data to the first network, for each of the TCP connections between the hosts;

a second storage area that holds the number of divided connections; and a bandwidth monitoring unit that conducts a primary determination of whether an increase or decrease in the number of divided connections is necessary, or not, on the basis of the request rate and the output rate, wherein when the increase in the number of divisions is necessary as a result of the primary determination of the bandwidth monitoring unit, and a relatively low-speed connection is detected from a plurality of connections of the second network, the connection division coupling unit conducts a communication with the use of only high-speed connections among the plurality of connections of the second network.

Configuration Example A-2

In a configuration example A-2, in the above-mentioned configuration example A-1, the above connection division coupling unit cuts off the relatively low-speed connection among the plurality of connections of the second network.

Configuration Example A-3

In a configuration example A-3, there is provided a method for controlling a network device that relays a TCP communication through a first network and a second network between hosts, including:

storing a request rate based on the amount of data input from the first network, and an output rate indicative of an effective bandwidth for transferring data to the second network, for each of TCP connections between the hosts;

dividing the data from the first network into a plurality of connections established with respect to a counter network device of the second network, and transfers the data, and couples the data through the plurality of connections from the second network, and transfers the data to the first network, for each of the TCP connections between the hosts;

primarily determining whether an increase or decrease in the number of divided connections is necessary, or not, on the basis of the request rate and the output rate; and conducting a communication with the use of only high-speed connections among the plurality of connections of the second network when the increase in the number of divisions is necessary as a result of the primary determination, and a relatively low-speed connection is detected from a plurality of connections of the second network.

Configuration Example A-4

In a configuration example A-4, there is provided a network system in which a first host and a second host communicate with each other through a wide area network, the network system comprising:

a first network device according to the configuration example A-1 which is arranged on the first host side; and a second network device according to the configuration example A-1 which is arranged on the second host side, wherein the first network device and the second network device are arranged through the wide area network, and the first host and the second host communicate with each other through a connection divided on the basis of an effective bandwidth of the wide area network.

Configuration Example B-1

A network device that relays a TCP communication through a first network and a second network between hosts, the network device comprising:

a first storage area that holds, for each TCP connection between the hosts, a request rate based on an amount of data input from the first network, and an output rate indicative of an effective bandwidth at which data is transferred to the second network;

a connection division coupling unit that, for each TCP connection between the hosts, divides data from the first network into a plurality of connections established with respect to an opposed network device in the second network, and transfers the divided connections, and couples data from the second network through the plurality of connections together, and transfers the coupled data to the first network;

a second storage area that holds the number of divided connections; and a bandwidth monitoring unit that increases or decreases the number of divided connections on the basis of the request rate and the output rate.

Configuration Example B-2

The network device according to the configuration example B-1, wherein the bandwidth monitoring unit compares the request rate with the output rate, and increases the number of divided connections if the request rate is equal to or larger than the output rate by a predetermined first threshold value.

Configuration Example B-3

The network device according to the configuration example B-1, wherein the bandwidth monitoring unit decreases the number of divided connections if the request rate is smaller than a predetermined second threshold value.

Configuration Example B-4

The network device according to the configuration example B-1, wherein when the number of divided connections is increased, a new connection is established with respect to the opposed network device through the second network, and the number of divided connections in the second storage area is updated, and identification information of the established connection is stored.

Configuration Example B-5

The network device according to the configuration example B-1, wherein
when the number of divided connections is decreased,
one of the connections corresponding to an appropriate TCP connection is selected from the second storage area,
processing of terminating the selected connection is conducted with respect to the opposed network device through the second network, and
the number of divided connections in the second storage area is updated, and identification information on the selected connection is deleted.

Configuration Example B-6

The network device according to the configuration example B-1, wherein
the bandwidth monitoring unit monitors the request rate per unit time based on an amount of data input within the unit time, and the output rate per unit time based on an amount of data transferred within the unit time, and obtains respective moving averages of the monitored request rate and the monitored output rate over a plurality of unit times as the request rate and the output rate.

Configuration Example B-7

The network device according to the configuration example B-1, wherein
the first storage area further holds a maximum value of the output rate per connection monitored when the connection has been divided into the number of divided connections in the past, wherein
when it is determined whether the number of divisions is increased or not, a maximum value of the output rate per connection in the present number of divided connections is compared with an output rate maximum value per connection in the number of divided connections smaller by one, and if its ratio is smaller than a predetermined third threshold value, it is determined that the division is unnecessary.

Configuration Example B-8

A method for controlling a network device that relays a TCP communication through a first network and a second network between hosts, the method including steps of:
storing, for each TCP connection between the hosts, a request rate based on an amount of data input from the first network, and an output rate indicative of an effective bandwidth at which data is transferred to the second network in a first storage area;
dividing, for each TCP connection between the hosts, data from the first network into a plurality of connections established with respect to an opposed network device in the second network, and transferring the divided connections, and coupling data from the second network through the plurality of connections together, and transferring the coupled data to the first network; and
increasing or decreasing the number of divided connections on the basis of the request rate and the output rate.

Configuration Example B-9

A network system in which a first host and a second host communicate with each other through a wide area network, the network system comprising:
a first network device according to the configuration example B-1 which is arranged on the first host side; and
a second network device according to the configuration example B-1 which is arranged on the second host side, wherein
the first network device and the second network device are arranged through the wide area network, and
the first host and the second host communicate with each other through a connection divided on the basis of an effective bandwidth of the wide area network.

Configuration Example B-10

A network system in which a first host and a second host communicate with each other through a wide area network, the network system comprising:
a first general purpose server device which is arranged on the first host side;
a second general purpose server device which is arranged on the second host side;
a first external storage medium that stores a program that executes a method according to the configuration example B-8, and related data therein, which is arranged on the first general purpose server device side; and
a second external storage medium that stores a program that executes a method according to the configuration example B-8, and related data therein, which is arranged on the second general purpose server device side, wherein
the first general purpose server device and the second general purpose server device are arranged through the wide area network,
the program and the related data are copied into the first general purpose server device from the first external storage medium,
the program and the related data are copied into the second general purpose server device from the second external storage medium, and
the first host and the second host communicate with each other through a connection divided on the basis of an effective bandwidth of the wide area network.

Configuration Example B-11

The network system according to the configuration example B-10, wherein
the first general purpose server device is the first host, and
the second general purpose server device is the second host.

The present invention is not limited to the above embodiments, but includes various modified examples. For example, in the above-mentioned embodiments, in order to easily understand the present invention, the specific configurations are described. However, the present invention does not always provide all of the configurations described above. Also, a part of one configuration example can be replaced with another configuration example, and the configuration of one embodiment can be added with the configuration of another embodiment. Also, in a part of the respective configuration examples, another configuration can be added, deleted, or replaced.

Also, parts or all of the above-described respective configurations, functions, processors, processing means may be realized, for example, as an integrated circuit, or other hardware. Also, the above respective configurations and functions may be realized by allowing the processor to interpret and execute programs for realizing the respective functions. That is, the respective configurations and functions may be realized by software. The information on the program, table, and file for realizing the respective functions can be stored in a storage device such as a memory, a hard disc, or an SSD (solid state drive), or a storage medium such as an IC card, an SD card, or a DVD.

Also, the control lines and the information lines necessary for description are illustrated, and all of the control lines and the information lines necessary for products are not illustrated. In fact, it may be conceivable that most of the configurations are connected to each other.

The present invention is available to, for example, a system using the TCP communication.

What is claimed is:

1. A network device that relays a TCP communication through a first network and a second network between a first host and a second host, comprising:
   a first storage area that holds a request rate based on the amount of data input from the first network, and a first output rate indicative of an effective bandwidth for transferring data to the second network;
   a connection division coupling unit that divides, for the TCP connection between the first and second hosts, the data from the first network into a plurality of connections established with respect to a counter network device of the second network, and transfers the data, and couples the data through the plurality of connections from the second network, and transfers the data to the first network; and
   a second storage area that holds a second output rate for each of the divided connections,
   wherein the connection division coupling unit conducts a communication with the use of a connection other than a relatively low-speed connection among the plurality of connections of the second network, or with reducing a use rate of the relatively low-speed connection, when the request rate is larger than the first output rate by a predetermined threshold value or larger, and the relatively low-speed connection having the second output rate equal to or larger than a given speed is detected from the plurality of connections of the second network.

2. The network device according to claim 1,
   wherein the second storage area holds the second output rates every given time, for each of the divided connections,
   the connection division coupling unit obtains, for each of the divided connections, an index indicative of a variation of the output rates for every given time in the respective divided connections, and
   it is determined whether the relatively low-speed connection is present or not, on the basis of the index indicative of the variation.

3. The network device according to claim 2,
   wherein the index indicative of the variation is a standard deviation or a dispersion.

4. The network device according to claim 3,
   wherein, when a ratio of the standard deviation or dispersion of two given connections is equal to or larger than a predetermined threshold value, one of the two connections smaller in the standard deviation or dispersion is detected as the relatively low-speed connection.

5. The network device according to claim 1, further comprising: a bandwidth monitoring unit that conducts a primary determination of whether an increase or decrease in the number of divided connections is necessary or not, on the basis of the request rate and the output rate,
   wherein the connection division coupling unit, as a result of the primary determination of the bandwidth monitoring unit, conducts a communication with the use of a connection other than the relatively low-speed connection among the plurality of connections of the second network, or with reducing a use rate of the relatively low-speed connection, when the request rate is larger than the output rate by a predetermined threshold value or larger to need the increase in the number of divisions, and the relatively low-speed connection is detected from the plurality of connections of the second network.

6. The network device according to claim 1,
   wherein the connection division coupling unit cuts off the relatively low-speed connection among the plurality of connections of the second network.

7. The network device according to claim 1,
   wherein the connection division coupling unit stops the use of the relatively low-speed connection among the plurality of connections of the second network.

8. The network device according to claim 1,
   wherein the connection division coupling unit reduces a use ratio of the relatively low-speed connection among the plurality of connections of the second network.

9. A network system in which a first host and a second host communicate with each other through a wide area network, the network system comprising:
   a first network device according to claim 1 which is arranged on the first host side; and
   a second network device according to claim 1 which is arranged on the second host side, wherein
   the first network device and the second network device are arranged through the wide area network, and
   the first host and the second host communicate with each other through a connection divided on the basis of an effective bandwidth of the wide area network.

10. A method for controlling a network device that relays a TCP communication through a first network and a second network between a first host and a second host, including:
    storing a request rate based on the amount of data input from the first network, and a first output rate indicative of an effective bandwidth for transferring data to the second network in a first storage area;
    dividing, for the TCP connection between the first and second hosts, the data from the first network into a plurality of connections established with respect to a counter network device of the second network, and transferring the data, and coupling the data through the plurality of connections from the second network, and transferring the data to the first network;
    storing a second output rate for each of the divided connections in a second storage area; and
    conducting a communication with the use of a connection other than a relatively low-speed connection among the plurality of connections of the second network, or with reducing a use rate of the relatively low-speed connection, when the request rate is larger than the first output rate by a predetermined threshold value or larger, and the relatively low-speed connection having the second output rate equal to or larger than a given speed is detected from the plurality of connections of the second network.

* * * * *